United States Patent [19]
McCourt et al.

[11] Patent Number: 5,150,307
[45] Date of Patent: Sep. 22, 1992

[54] COMPUTER-CONTROLLED SYSTEM AND METHOD FOR SORTING PLASTIC ITEMS

[75] Inventors: Carroll T. McCourt; Charles J. Emering, both of Westminster; Douglas S. Laurence, Columbia; Roy A. Eckhart, Baltimore; William Cass, Timonium, all of Md.

[73] Assignee: Automation Industrial Control, Inc., Baltimore, Md.

[21] Appl. No.: 596,940

[22] Filed: Oct. 15, 1990

[51] Int. Cl.$^5$ .......................... G06F 15/20; B07C 5/08
[52] U.S. Cl. ........................... 364/478; 209/556; 209/580; 250/223 R; 356/73; 356/240; 364/526
[58] Field of Search ............... 364/478, 525, 526, 550; 209/523, 524, 555, 556, 580–582, 588, 538, 546, 539, 920, 930, 939, 674; 356/73, 240, 402, 425, 346; 250/223 R, 223 B, 225, 226

[56] References Cited

U.S. PATENT DOCUMENTS

| | | | |
|---|---|---|---|
| Re. 29,031 | 11/1976 | Irving et al. | 209/564 |
| 3,060,790 | 10/1962 | Ward | 356/402 |
| 3,476,132 | 11/1969 | Gebel | 356/402 |
| 3,650,396 | 3/1972 | Gillespie et al. | 209/3 |
| 3,720,380 | 3/1973 | Marsh | 241/20 |
| 3,747,755 | 7/1973 | Senturia et al. | 209/559 |
| 3,802,558 | 4/1974 | Rhys | 209/557 |
| 4,106,628 | 8/1978 | Warkentin et al. | 209/556 |
| 4,110,826 | 8/1978 | Mölligaard et al. | 364/526 |
| 4,142,636 | 3/1979 | Planke | 209/524 |
| 4,207,986 | 6/1980 | Cerroni | 209/616 |
| 4,235,342 | 11/1980 | Braham | 209/564 |
| 4,414,566 | 11/1983 | Peyton et al. | 358/101 |
| 4,437,985 | 3/1984 | Hinds et al. | 209/538 |
| 4,546,885 | 10/1985 | Satake | 209/548 |
| 4,679,075 | 7/1987 | Williams et al. | 358/106 |
| 4,687,107 | 8/1987 | Brown et al. | 209/556 |
| 4,693,378 | 9/1987 | Azegami et al. | 209/586 |
| 4,693,379 | 9/1987 | Stehle | 209/674 |
| 4,728,045 | 3/1988 | Tomaszek | 241/19 |
| 4,735,323 | 4/1988 | Okada et al. | 209/582 |
| 4,760,925 | 8/1988 | Stehle et al. | 209/616 |
| 4,771,894 | 9/1988 | Lapp | 209/632 |
| 4,776,466 | 10/1988 | Yoshida | 209/565 |
| 4,809,574 | 3/1989 | Cremona | 209/644 X |
| 4,813,000 | 3/1989 | Wyman et al. | 364/526 |
| 4,818,380 | 4/1989 | Azegami et al. | 209/565 |
| 4,873,644 | 10/1989 | Fujii et al. | 364/478 |
| 4,884,696 | 12/1989 | Peleg et al. | 209/545 |
| 4,888,714 | 12/1989 | Dingle | 364/525 |
| 4,919,534 | 4/1990 | Reed | 356/73 |
| 4,929,342 | 5/1990 | Johnston | 209/12 |

Primary Examiner—Joseph Ruggiero
Attorney, Agent, or Firm—Sterne, Kessler, Goldstein & Fox

[57] ABSTRACT

A computer-controlled system and method for separating and sorting plastic items is provided. The computer-controlled system first comprises a first component for separating, singulating and orientating the plastic items, a second component for identifying the composition of the plastic material, a third component for identifying the color of the plastic material, and a fourth component responsive to the first and second component for distributing the plastic material to a specific collection vessel. The method of the present invention comprises a first step of separating, singulating and orientating the plastic items. The second step of the method of the present invention is to determine the composition of the plastic item. The third step of the method of the present invention is to determine the color of each plastic item. The fourth step of the method of the present invention is to discharge each plastic item to an appropriate collection vessel based on the plastic item's color and composition.

29 Claims, 15 Drawing Sheets

| PLASTIC ITEM ENTRY NUMBER | COLOR I.D. | COMPOSITION I.D. |
|---|---|---|
| 005 | WHITE | PET |
| 004 | CLEAR | PVC |
| 003 | CLEAR | HDPE |
| 002 | UNKNOWN | PVC |
| 001 | CLEAR | UNKNOWN |
| | | |
| | | |
| | | |
| | | |

*Figure 7b*

COMPUTER-CONTROLLED SYSTEM AND METHOD FOR SORTING PLASTIC ITEMS

BACKGROUND OF THE INVENTION

1. Field of the Invention

The present invention relates generally to a computer-controlled system and method for sorting items. More specifically, the present invention relates to a computer-controlled system for sorting recyclable waste items such as plastics and glass.

2. Related Art

Solid waste material of the type exemplified by municipal waste and more specifically plastic and/or glass waste have traditionally presented problems of disposal. The disposal problem has become increasingly critical in recent years as a result of increased production of plastic waste items.

Conventionally, such plastic waste items have been disposed of by such means as incineration and landfill. Incinerating and landfill operations present significant environmental problems not to mention depletion of valuable resources. As a result, there exists a great need to recycle plastic waste items.

Plastic waste items typically take the form of plastic bottles. However, many other items too numerous to specify here are made from plastic materials.

To make plastic recycling effective, it is necessary to segregate the returned plastic items into groups whose scrap price is inherently higher then unsegregated plastic items. In other words, it is necessary to separate the polyethylene terephthalate (PET) items from the polyvinyl chloride (PVC) items or from the high density polyethylene (HDPE) items, etc. In addition to separating by type of plastic, it is often necessary to further separate a specific type of plastic item by its color. Plastic items further segregated by their color are even more valuable. This is because recycling a PVC item with a PET item will not result in a pure PVC or PET end product. As a result, the recycled polymer (a combination of PVC and PET) cannot be widely used by the plastic industry. Therefore, for recycling to be most cost effective, it is necessary for example to separate PVC from PET, and further, green PET from clear PET: type and color.

Several practical issues need to be addressed when sorting plastic waste items. One such concern relates to the size of the plastic item to be examined. Plastic waste items often are initially packed together in a crushed form in what is termed a "bail." A typical bail is about four feet by four feet by six feet (4×4×6 ft.). These bails are broken apart by what is known in the art as a "bail breaker."

As a result of this bail breaking operation, the plastic items although broken apart may be resting one on top of the other. Moreover, the plastic waste items may have been cut into smaller pieces which range in size and configuration. Any sortation system must be able to handle a variety of sized plastic items and to disregard items which are too small or large. In addition, as a result of the bail breaking operation, any sortation system must also be able to fully separate the plastic waste items determined examinable.

An additional concern is that plastic waste items are typically a composite of several types of plastics. By way of example only, a typical soda (soft drink) container may have a bottom cap which is made of a plastic material different than the container material and/or the cap material. In these circumstances, it is often desirable to sort the plastic waste items based on the dominant type of plastic present.

Conventional sorting of plastic waste items has often been performed using manual means. As will be readily evident, a manual based sorting system is very labor intensive, making recycling costs high. Recycling costs are high because the speed at which the plastic items can be sorted is slow. Additionally, it is difficult to find people to do such work and turnover of such people is high. Moreover, manual sorting is susceptible to error. A person can easily miss-classify a given piece of plastic. Improper sorting significantly reduces the value of the recovered plastics due to the impurities caused by the missorted items as discussed above.

Sorting systems have also been developed that sort plastic by x-ray detection. An x-ray based sorting system has obvious health related drawbacks. Another problem inherent with x-ray detection or similar systems is that of singulation and orientation. In order to properly examine a plastic item, the plastic items must be spaced a sufficient distance apart so that proper examination can be made. Furthermore, the plastic items should be properly situated so that accurate examination can be made.

Sorting systems have also been developed that sort plastic items using hydrocyclones and flotation tanks employing water and alcohol based media. Systems of this type separate dissimilar plastics by specific gravity using centrifugal forces. Systems of this type also have significant drawbacks. One such disadvantage is that specific gravity based systems are not very accurate. The degree of sortation in such a system is small allowing only a relatively few types of plastic items to be separated. Moreover, such systems sort the plastic items slowly.

SUMMARY OF THE INVENTION

The present invention is a computer-controlled system and method for sorting plastic items at a high "through-rate". The term through-rate is hereby defined as the speed at which the plastic items are sorted. The system and method of the present invention, although herein to be described with reference to sorting items made of plastic at high through-rates, can be configured to sort items made from materials other than plastic and configured to sort at slower or faster through-rates. Such other materials include, but are not limited to, glass in the form of glass bottles.

Plastic items may take a number of shapes and forms. One typical form of plastic item is the plastic container, such as used to contain beverages and the like. The present invention, however, can sort a variety of other forms of plastic items to include, but not limited to, plastic houseware items such as food containers. As will become apparent herein, the sorting system and method of the present invention allows for cost effective recycling of plastic waste items.

In one embodiment, the present invention generally comprises a bail breaker sub-system and step, a separating, singulating, and orientation (SSO) sub-system and step, a color determination sub-system and step, a composition determination sub-system and step, and a sortation and discharge sub-system and step. This embodiment may further comprise an operator interface and data acquisition sub-system and step.

The SSO sub-system and step is generally provided to process the plastic items after they have been broken apart by the bail breaker sub-system and step. The SSO sub-system is adapted to perform several functions. The first function of the SSO sub-system is to separate the plastic items that can be examined (defined herein as the acceptable plastic items) from the plastic items that cannot be examined (defined herein as unacceptable plastic items). This is necessary because the plastic items that are received from the bail breaker vary in size, some of which are too small to sort. The SSO sub-system discharges the plastic items that are too small to sort to a waste collection vessel.

The SSO sub-system further functions to singulate each of the plastic items. The function singulate is hereby defined to mean the process of providing a spacing between each of the plastic items This function is necessary so that each of the plastic items can be properly examined The SSO sub-system further functions to orientate each plastic item in a specified direction, which is typically lengthwise. This function is necessary so that each of the plastic items can also be properly examined.

The separation function of the SSO sub-system is accomplished using a plurality of vibrating beds. The vibrating beds each operate on vibrating bed technology. The vibrating bed is designed to force the unacceptable plastic items (too small to sort) onto a lower conveyor while the other plastic items (plastic items that can be examined and sorted) are distributed to an upper conveyor The unacceptable plastic items are then discharged to a waste collection vessel. The acceptable plastic items are then oriented and singulated by a series of subsequent conveyors. Because the present invention operates at high through-rates, the singulation and orientation of the plastic items must occur very quickly.

Thereafter, the plastic items are transported to an inspection conveyor. The inspection conveyor transports the plastic items to the color determination sub-system and the composition determination sub-system for subsequent examination.

The color determination sub-system and step is provided to examine each plastic item (color and composition identification, respectively) to identify the color of the plastic item. The color determination sub-system generally comprises a color determination device and a color determination computer.

The color determination device examines the plastic items as they pass through it on the inspection conveyor and captures a video image (two dimensional) of the plastic item. The color sortation device then outputs the video image in red/green/blue (RGB) format to the color determination computer.

The color determination computer is provided to identify the predominant color of the plastic item. The color determination computer is first configured to digitize the RGB image of the plastic item and to divide the same into a grid of groups of pixels. Thereafter, each grid is analyzed on a pixel by pixel level to determine a RGB color of the particular grid. Based on a grid by grid color analysis, the color determination computer is further configured to determine the dominant color of the plastic item based on the individual grid color determinations.

The computation time for examining each pixel of each grid to determine the color of each grid is a very time consuming task for the color determination computer. Furthermore, because the size of the video image captured by the color determination device is fixed, examination of a small plastic item may lead to a digitized image that represents only a small plastic item (centered in the digitized image) and a very large surrounding area of image representing an inspection conveyor (background image). Computational analysis of the background image is irrelevant and wasteful.

To reduce irrelevant computation time, a length array detector is provided The length array detector senses the beginning and end of the plastic item as it approaches the color determination device. This data is outputted to the color determination computer wherein the centroid of the plastic item is determined. The color determination computer, using the centroid information, is configured to reduce the digitized RGB image to substantially that of the plastic item. In other words, the background area surrounding the plastic item (such as a conveyor provided to transport the plastic item) is removed from the digitized image prior to color analysis. Thereafter, the color analysis of only the plastic item image on a pixel by pixel level is performed The inspection conveyor is provided to transport the plastic items through the color determination device The composition determination sub-system and step is provided to examine each plastic item and to identify the plastic item's composition. The composition determination sub-system generally comprises an Infrared (IR) device and a composition determination computer.

The IR device examines each plastic item as it passes through it on the inspection conveyor and outputs data indicative of the interferogram of the material to the composition determination computer. The IR device generally comprises a photospectrometer unit and a detector. The photospectrometer unit examines the plastic item by focusing a beam of light through the plastic item. The light that is transmitted through the plastic item is received (sensed) by the detector. Depending on the IR device configuration, multiple (two or more) examinations of the same plastic item may be taken, resulting in multiple (two or more) interferograms.

The IR device is positioned on the same inspection conveyor as is the color determination device. The inspection conveyor is provided with a spacing such that the IR device can properly examine the plastic items: the light beam needs to be transmitted through the plastic items and received (sensed) by the detector without interference.

The composition determination computer is provided to determine the predominant composition of the plastic item under examination. The composition determination computer primarily determines the composition of a plastic item by generating a spectral analysis. The spectral analysis is generated by running the interferogram through a fourier transform.

However, the conversion from the interferogram to the spectral analysis is a very time consuming task for the composition determination computer. To reduce computation time, the composition determination computer is first configured to filter out interferogram samples that are irrelevant. Such interferograms may be that of air samples taken just before of after the plastic item has passed through the IR device. The remaining interferograms are converted to a full spectral analysis. Using each of the spectral analysis, the composition determination computer is configured to identify the predominate composition of the plastic item.

In one embodiment of the present invention, the composition of plastics such as PET, HDPE, and PVC can be determined. Using the spectral analysis, however, the composition determination computer can be configured to determine the composition of a much greater number of plastic items.

The sortation and discharge sub-system and method is provided to discharge each of the plastic items based on their color and composition to one of a plurality of collection vessels. The sortation and discharge sub-system generally comprises a discharge conveyor and a process control computer.

The discharge conveyor of the present invention is first adapted to receive each plastic item as it exits from the composition determination sub-system via the inspection conveyor. The discharge conveyor generally comprises a single conveyor and a plurality of distribution gates positioned on the single conveyor. Each distribution gate leads to a collection vessel. Each of the distribution gates are solenoid actuated and "open" and "close" based upon commands received from the process control computer.

The discharge conveyor further comprises a plurality of air blast units. An air blast unit is positioned directly across from each distribution gate. The actuation of a particular air blast unit causes a stream of air to "hit" a moving plastic item, to thereby discharge the plastic item into the collection vessel.

The discharge conveyor further comprises a rotor pulser unit. The rotorpulser unit is provided to output signals to the process control computer indicative of how much the conveyor has moved (rotorpulser measures or counts distance that the conveyor has moved).

The process control computer is configured to receive input from the color determination sub-system (being in communication with the color determination computer) and the composition determination sub-system (being in communication with the composition determination computer). The input from the color determination sub-system is indicative of the color of the plastic item just examined therein. The input from the composition determination sub-system is indicative of the composition of the plastic item just examined therein. The process control computer stores the plastic item's corresponding color and composition in a "pushdown" shift register.

The process control computer is further provided to monitor when the plastic item is adjacent to its designated distribution gate. When a plastic item is positioned at its designated distribution gate, the process control computer "opens" the distribution gate and activates the corresponding air blast unit (positioned across from the distribution gate). To accomplish this, the process control computer is configured with a photoeye positioned at the point where the plastic items first enter the conveyor. Thereafter, positional tracking is accomplished with the use of the rotorpulser to track the position of the plastic items as they move down the conveyor. Alternatively, positional tracking could be accomplished using time sequence data.

The present invention may further comprise an operator interface and data acquisition sub-system and step. The operator interface and data acquisition sub-system can be configured to give, for example, an operator significant control of the system. By way of example only, the operator may be inclined to change the distribution gate for a certain type of plastic. The operator interface and data acquisition sub-system provides the operator with such a feature.

The operator interface and data acquisition system may further operate to collect data. By way of example only, such data collection may be that of the quantity and type of plastic items sorted, and destination of the sorted plastic items. This information may be valuable in generating an inventory data for environmental reports.

The present invention may further comprise a bail breaker sub-system and step. The bail breaker sub-system and step is generally provided to break apart the crushed bails of plastic items.

The method of the present invention first comprises the step of preparing each of the plastic items for examination by the color determination sub-system and the composition determination sub-system. The first step may further comprise the step of separating the plastic items into items that can be examined from items that cannot be examined. The first step may further comprise the step of singulating the plastic items; providing spacing between plastic items prior to examination. The first step may still further comprise the step of orientating the plastic items in a specified direction (for example, lengthwise) with respect to the moving inspection conveyor.

The second step of the method of the present invention is to identify the color of each plastic item. The second step may further comprise the steps of taking a video picture of the plastic item. The second step may still further comprise the step of determining the edges of the plastic item in the picture and performing color analysis only within the edge boundaries.

The third step of the method of the present invention is to identify the composition of the plastic item. The third step may further comprise the step of examining the interferogram of the plastic item to thereby remove data that is irrelevant to the determination of the predominant composition of the plastic item. The third step may still further comprise the step of generating a spectral analysis of each plastic item from the interferograms. The third step may yet further comprise the step of examining the spectral analysis of the plastic item to remove data that is irrelevant to the predominant composition of the plastic item.

The fourth step of the method of the present invention is to discharge each plastic item to an appropriate collection vessel based on the plastic item's predominant color and composition. The fourth step may further comprise the step of monitoring the position of the plastic item throughout the system and actuation of a distribution gate to thereby discharge the plastic item to a collection vessel. The fourth step may still further comprise the step of discharging plastic items that do not have predetermined color and composition or plastic items that generate "error" signals to a separate collection vessel The method of the present invention may further comprise a fifth step of storing data indicative of the quantity and type of plastic items discharged. The fifth step may further comprise the step of controlling the color and composition of plastic item to be discharged to a given collection vessel.

The above summary of the invention has described only one embodiment of the present invention. As will be more fully described in other parts of this disclosure, the present invention may take the form of numerous configurations of the sub-systems and steps described above, or with different or additional sub-systems and steps. By way of example only, herein discussed, the plastic items are first examined by the color determination sub-system and then by the composition determination sub-system.

By way of example only, such alternative configurations of the same sub-systems may comprise the composition determination sub-system being interchanged with the color determination sub-system.

By way of another example, the present invention has been summarily described with reference to a "single examination line". By way of example only, an alternative embodiment may comprise a "dual examination line." Such a dual line approach may comprise two examination lines which receive in parallel plastic items from the SSO sub-system. Each line would comprise a color determination sub-system, composition determination sub-system, and a sortation and discharge sub-system positioned immediately after the SSO sub-system. The above configuration may significantly increase the "through-rate" of the system. As will be more fully described herein, there are many other configurations of the present invention.

BRIEF DESCRIPTION OF THE DRAWINGS

The following detailed description will be more fully understood with reference to the accompanying drawings in which:

FIG. 7B is a diagram showing the "push down" shift register;

DETAILED DESCRIPTION OF THE PREFERRED EMBODIMENTS

The following detailed description will be made with reference to separating and sorting plastic items. As will become readily apparent herein, the system and method of the present invention can be easily adapted to separate and sort other items. Such other items include, but are not limited to, glass, ceramics, and/or paper. Moreover, such other items may further take a variety of forms such as a glass bottle or ceramic plates or the like.

Overview of One Embodiment of the Present Invention

Figure 1:
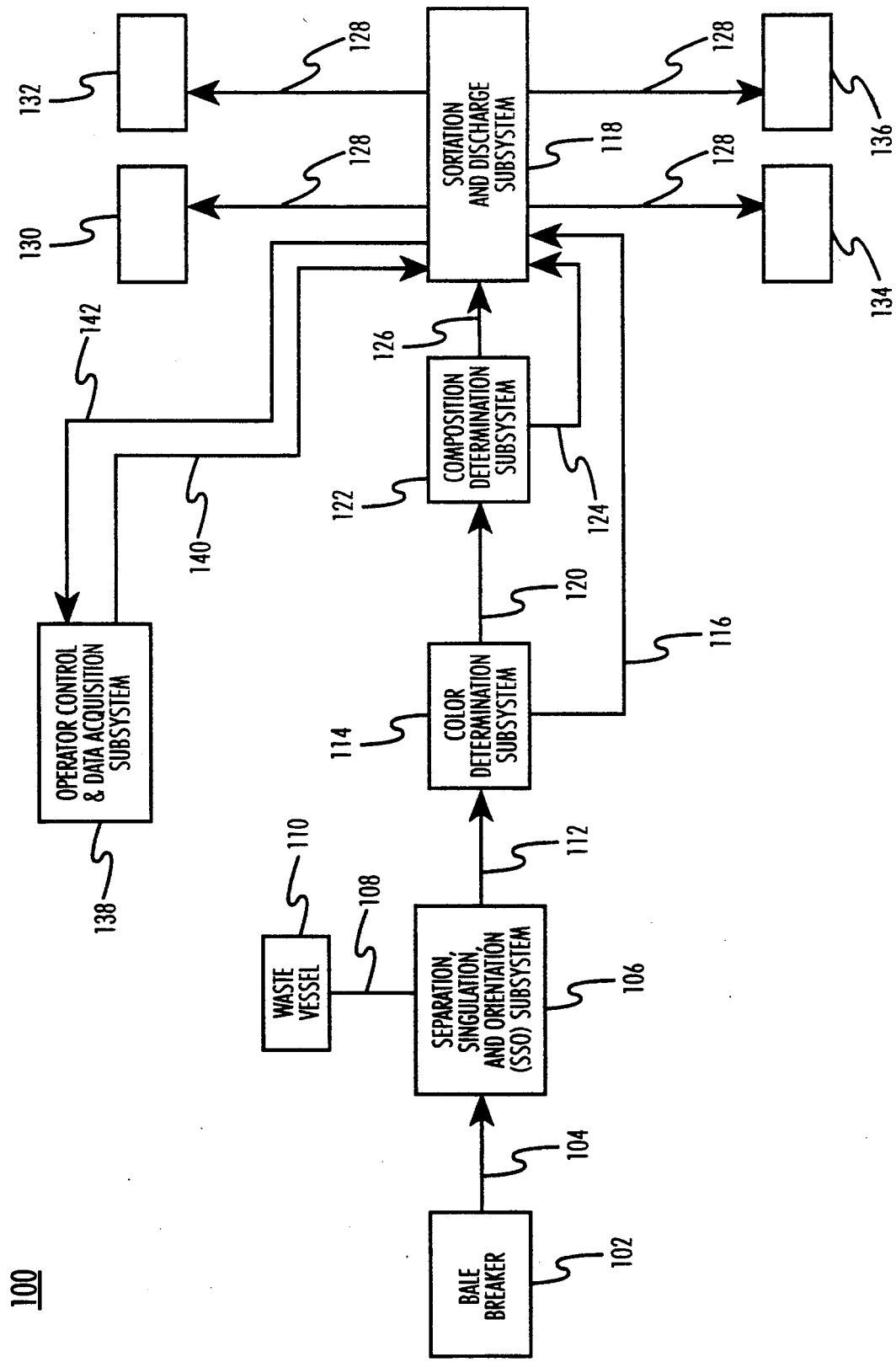
FIG. 1 shows a high level block diagram of the preferred embodiment of present invention.

Referring first to FIG. 1, where a high level presentation of the system 100 and the method of the present invention is shown. The present invention is designed to sort, for example, plastic items at high "through-rates." The term through-rate is hereby defined as the speed at which the present invention can sort plastic items The term sort is hereby defined as taking a plastic item from the bale breaker and discharging it to an appropriate collection vessel based on the plastic items color and composition (to be described).

The present invention is contemplated to have a desired through-rate of between one and seven plastic items per second. This range of through-rates makes the present invention a high speed system 100 and method. The ability of the present invention to sort at high through-rates is one significant feature.

High through-rates give rise to certain occurrences and/or special requirements, which may raise control and/or transport issues for the present invention. For example, these occurrences and/or special requirements may relate to (a) the transportation of the plastic items through the system 100, (b) proper orientation of the plastic items while the plastic items are being transported so that proper examination can be made prior to sortation, (c) removal (either by mis-operation or intervention by the operator) of a plastic item from the system 100, and (d) mis-identification of the color and/or composition of the plastic item. It is contemplated that the present invention handle and/or correct for such occurrences and/or special requirements.

As shown in Figure the present invention generally comprises a bale breaker 102. Bale breaker 102 is provided to break-apart a bale of plastic (not shown), to be sorted. A bale may be made up of many plastic items of different shapes and sizes. In this embodiment, the plastic items are presented in bales. However, alternative embodiments of the present invention include plastic items that are not baled. The plastic items that are broken apart using bale breaker 102 may be resting one on top of the other, and in a variety of orientations. Bale breaker 102 is of conventional design.

Further shown is a separation, singulation and orientation (SSO) sub-system 106. As indicated by a path 104, SSO sub-system 106 is generally provided to process the plastic items after they have been broken apart by the bale breaker 102.

SSO sub-system 106 is adapted to perform several functions. The first function of the SSO sub-system 106 is to separate the plastic items that can be examined (defined herein as the "acceptable" plastic items) from the plastic items that cannot be examined (defined herein as the "unacceptable" plastic items). This is necessary because the plastic items that are received from the bale breaker 102 vary in size, some of which are too small to sort. Alternative embodiments may separate plastic items which are too large. The SSO sub-system 106 discharges such unacceptable plastic items to a waste collection vessel 110 via a path 108.

The SSO sub-system 106 further functions to singulate each of the plastic items. The function singulate is hereby defined to mean the process of providing a specified spacing between each of the plastic items. As will be more fully described herein, the singulating function is necessary so that each of the plastic items can be properly examined for sortation.

The SSO sub-system 106 further functions to orientate each plastic item in a specified direction (for example, lengthwise). This function is necessary so that each of the plastic items can be properly examined and transported.

The present invention further comprises a color determination sub-system 114. Color determination sub-system 114 is provided to examine each of the plastic items to identify its color. As shown by path a 112, the plastic items exit the SSO sub-system 106 and then enter the color determination sub-system 114.

The present invention further comprises a composition determination sub-system 122. Composition determination sub-system 122 is provided to examine each of the plastic items to identify its composition. As shown by a path 120, the plastic items exit the color determination sub-system 114 and enter the composition determination sub-system 122.

The present invention further comprises a sortation and discharge sub-system 118. In this embodiment, the sortation and discharge sub-system 118 is provided to receive the plastic items from the composition determination sub-system 122 (via a path 126) and to sort each of the plastic items by color and composition in accordance with data provided by sub-systems 114 (via a path 116) and 122 (via a path 124) to one of a plurality of collection vessels 130, 132, 134, or 136 along paths 128. The collection vessels 130, 132, 134, and 136 may be designated (by the user or operator) to receive a plastic item having a particular color and composition.

By way of example only, collection vessel 130 may be that designated for clear PET, collection vessel 132 for all other color PET, collection vessel 134 for all color of PVC, and collection vessel 136 for all other plastic items not distributed to the other collection vessels. As will be explained herein, however, the present invention may be alternatively configured. By way of example only, such alternative configurations may comprise discharging the plastic items to the collection vessels based only on color.

The system 100 may further comprise an operator control and data acquisition sub-system 138. Operator control and data acquisition sub-system 138 is provided to allow the operator (user) to interface with the present invention via a data input line 140 and a data output line 142. By way of example only, the user can change the color and composition of the plastic items to be sorted to collection vessel 130 to collection vessel 132.

Operator control and data acquisition sub-system 138 is further provided to collect data. By way of example only, such data collection may be that of the quantity (number) of a plastic item discharged into a collection vessel. This may allow the filled collection vessel, for example, to be sold directly to a customer without additional processing.

Separation, Singulation, and Orientation Sub-system and Step

Figure 2A:
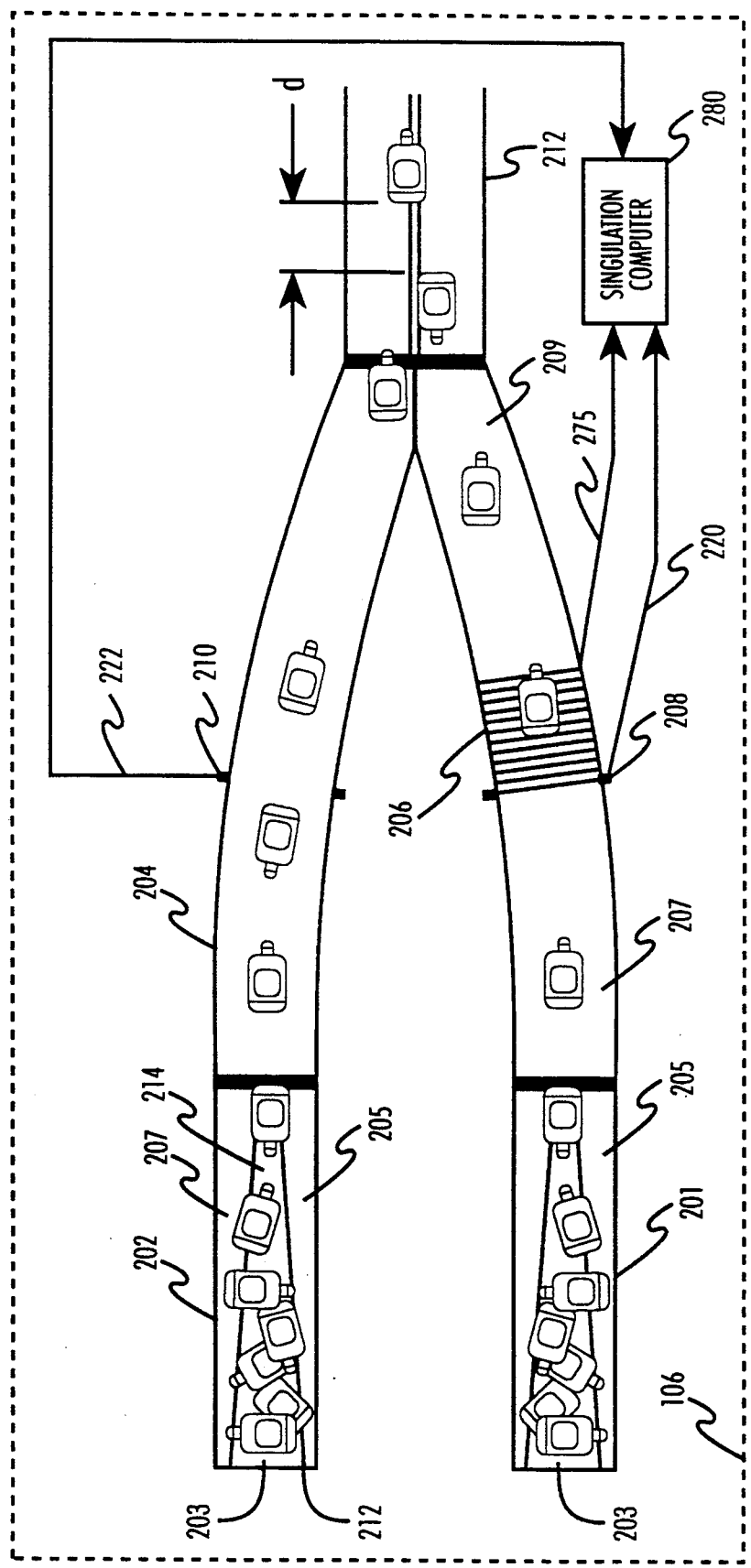
FIG. 2A is a diagram showing a more detailed view of the separating, singulating and orientation sub-system (SSO sub-system)

Referring now to FIG. 2A, wherein the SSO sub-system 106 is illustrated in more detail. The SSO sub-system 106 is the first device encountered by the plastic items after they are broken apart by the bale breaker 102. In this embodiment the SSO sub-system 106 provides three functions: separation, singulation, and orientation.

The separation function of the SSO sub-system 106 is provided by a first vibrator bed 201 and a second vibrator bed 202. Vibrator beds 201 and 202 are each based on vibrating bed technology. Vibrator bed 201 is of the same design as that of vibrator bed 202. As such, the following description of vibrator bed 202 is equally applicable to vibrator bed 201.

Vibrator bed 202 is provided to separate, based on the size, plastic items that cannot be examined ("unacceptable" plastic items) from plastic items that can be examined ("acceptable" plastic items). For example, plastic items that are very small may be difficult to examine, and this unacceptable.

Vibrator bed 202 generally comprises a lower conveyor 203 and an upper conveyor 205. Vibratory bed 202 further comprises at least one fin 207 mounted on the vibratory bed 202. Fin 207 is of a "V-shape" design, wide at an one end 212, and narrow at another end 214. The fins 207 are further provided with a gradual incline (not shown; for example; one inch to about four inches), such that the movement of the lower conveyor 203 causes the acceptable (in terms of size) plastic items to "walk" (move) up the incline and onto the upper conveyor 205. The smaller items which are unacceptable, stay in the "V" of the fin 207 and are forced down onto the lower conveyor 203. The plastic items on the lower conveyor 203 are transported to another conveyor (not shown) wherein they are discharged to the waste collection vessel 110 in an unsorted form. As discussed above, vibrator beds 201 and 202 provide the separating function (by size) of the SSO sub-system 106.

The separating function of SSO sub-system 106 may be based on technologies other than a vibrating bed. By way of example only, SSO sub-system 106 may employ a water density based technology and/or other electromechanical based technologies.

In addition to separation, the SSO sub-system 106 functions to singulate the plastic items that are being transported on the upper conveyors 205 of the vibrator beds 201 and 202 into a single line on a conveyor 212. A singulated position is when a specified spacing "d" exists between each of the plastic item on the conveyor 212. A specified spacing is necessary so that the plastic items can be properly examined by the color determination sub-system 114 and composition determination sub-system 122. As will be fully discussed, conveyor 212 transports the plastic items to the color determination sub-system 114.

Singulation of the plastic items is accomplished with a plurality of conveyors 204, 207, 206, and 209. Singulation is needed so that the present invention can examine and then sort the plastic items one at a time. Conveyor 204 is provided to receive the plastic items as they exit from the upper conveyor 205 of vibrator bed 202. Conveyor 207 is provided to receive the plastic items as they exit from the upper conveyor 205 of vibrator bed 201. Conveyors 204 and 207 may be configured to be operating at substantially the same speed. Conveyors 204 and 207 are of conventional design.

Conveyor 206 is generally provided to "slow" down the travel of the plastic items as they travel from the conveyor 207 to the conveyor 209. The "slowing down" of the plastic items by conveyor 206 causes the plastic items to enter conveyor 212 at different times and thus in a singulated position. Conveyor 206 is likewise of conventional design. The conveyor 209 is generally operating at the same speed as that of conveyor 207. The speed of conveyor 206 may be controlled by a singulation computer 280 via a line 275.

Further shown are a first pair of photoeyes 208 and a second pair of photoeyes 210 Photoeyes 208 and 210 operate to output a signal to the singulation computer 280 (via lines 220 and 222, respectively) indicative of the presence of a plastic item. The signals from the photoeyes 208 and 210 are used by the singulation computer 280 to control the speed of conveyor 206 such that the plastic items enter conveyor 212 at different times and thus in a singulated position.

For example, if a plastic item is sensed at the photoeye 210 and photoeye 208, the speed of conveyor 206 may be reduced (slowed), causing the plastic item at photoeye 210 to reach conveyor 212 before the plastic item sensed at photoeye 208. Alternatively, if no plastic item is sensed at the photoeye 210, then the speed of conveyor 206 could, for example, be increased.

Figure 2B:
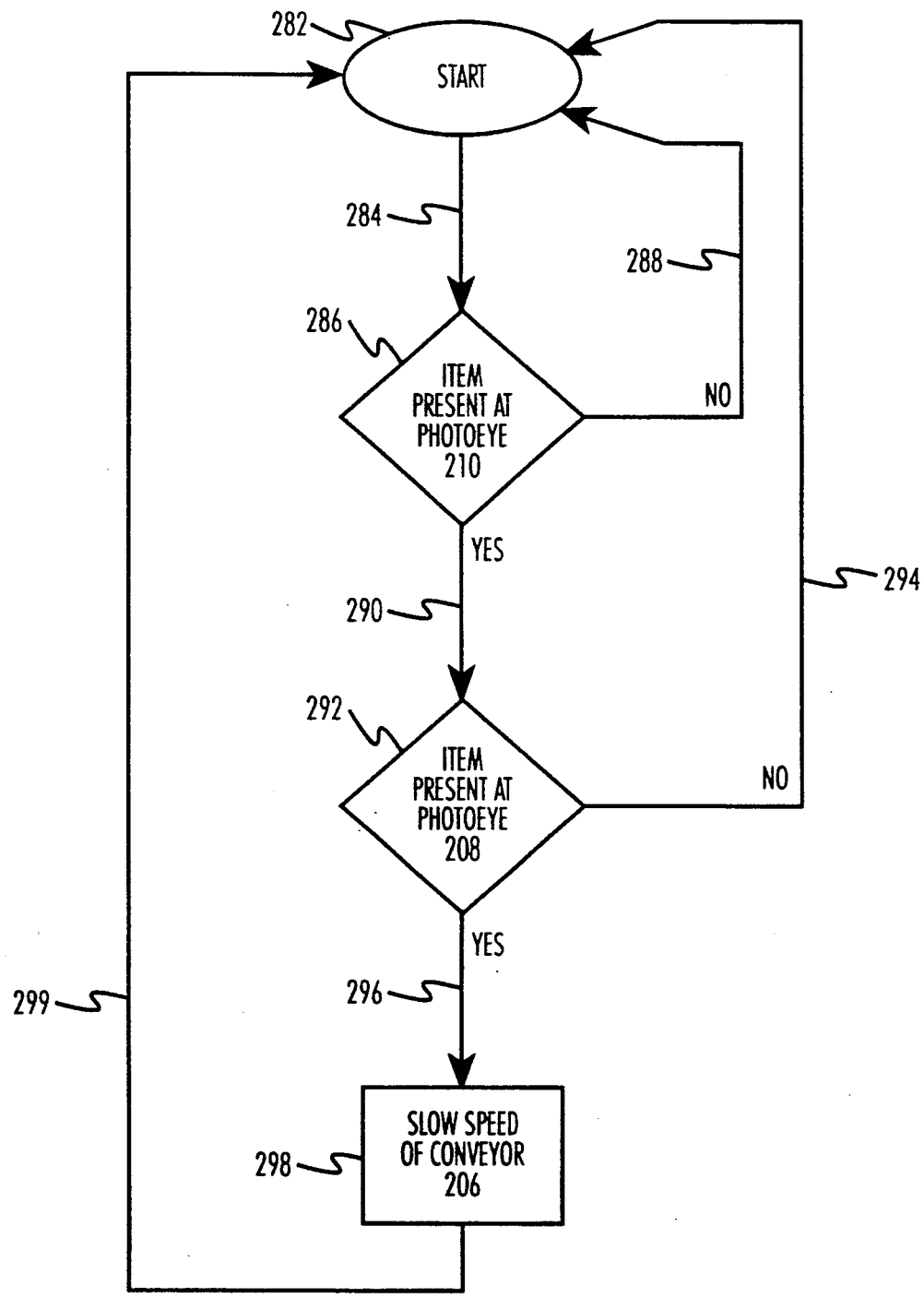
FIG. 2B is a high-level flow chart showing the operation of the singulation computer.

Refer now to FIG. 2B, which is a block diagram showing the operation of the singulation computer 280. Operation is initiated by a start block 282. Control is passed along a logic path 284 to a decision block 286.

As shown by decision block 286, the singulation computer 280 is first instructed to "look at" (examine) the photoeye 210 to determine whether a plastic item is present. If no plastic item is present at photoeye 210, then control is returned to the start block 282 along a logic path 288. If, however, a plastic item is present at the photoeye 210, then control is passed via a logic path 290 to a decision block 292.

As shown by decision block 292, the singulation computer 280 is then instructed to determine whether a plastic item is present at the photoeye 208. If no plastic item is present at photoeye 208, then control is returned to the start block 282 along a logic path 294. If, however, a plastic item is present at the photoeye 208, then control is passed via a logic path 296 to an operation block 298.

As shown by operation block 292, the singulation computer 280 is then instructed to slow down the speed of the conveyor 206. Slowing down the conveyor 206 allows the plastic item positioned at the photoeye 210 to enter the conveyor 212 before the plastic item positioned at the photoeye 208. Control is then returned to start block 2819 via a logic path 299.

In addition to the functions of separation and singulation discussed heretofore, the SSO-sub-system 106 further functions to orientate each of the plastic items. Orientation is hereby defined as the function of positioning each of the plastic items in a specified direction. In this embodiment, the specified direction is lengthwise. To achieve the lengthwise orientation, the conveyor 212 (shown in FIG. 2A) is adapted such that the plastic items are forced to their lengthwise direction.

Figure 2C:
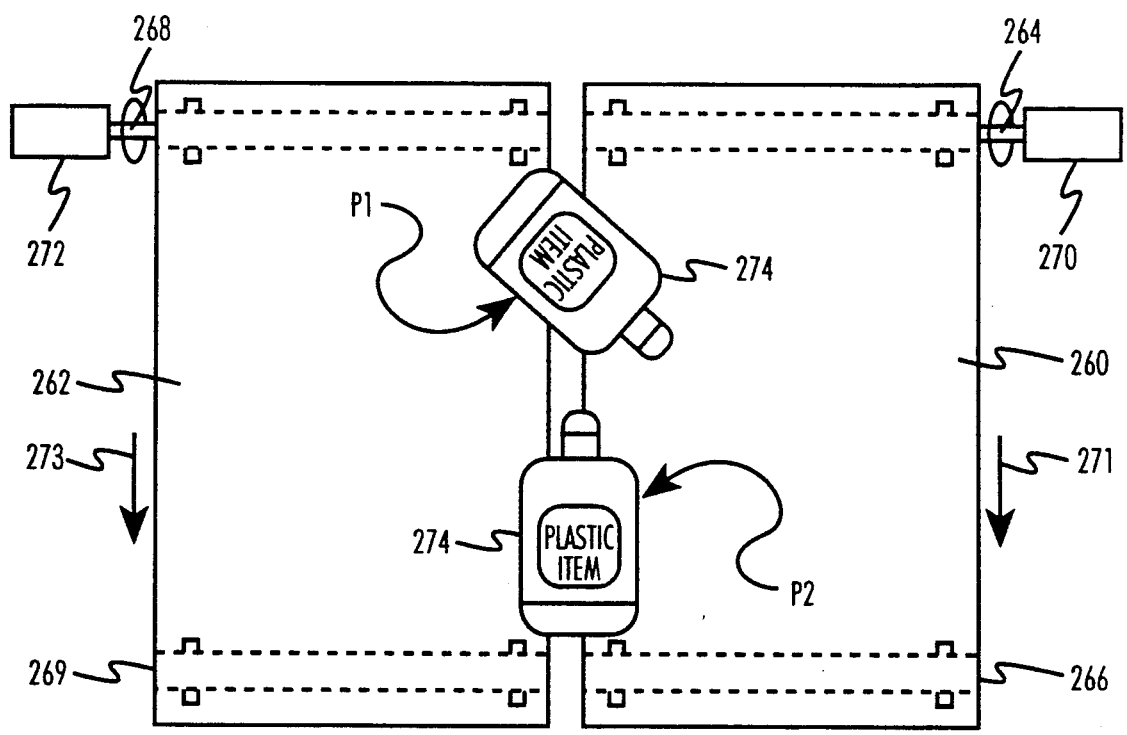
FIGS. 2C and 2D are a diagram showing a conveyor of the present invention.
Figure 2D:
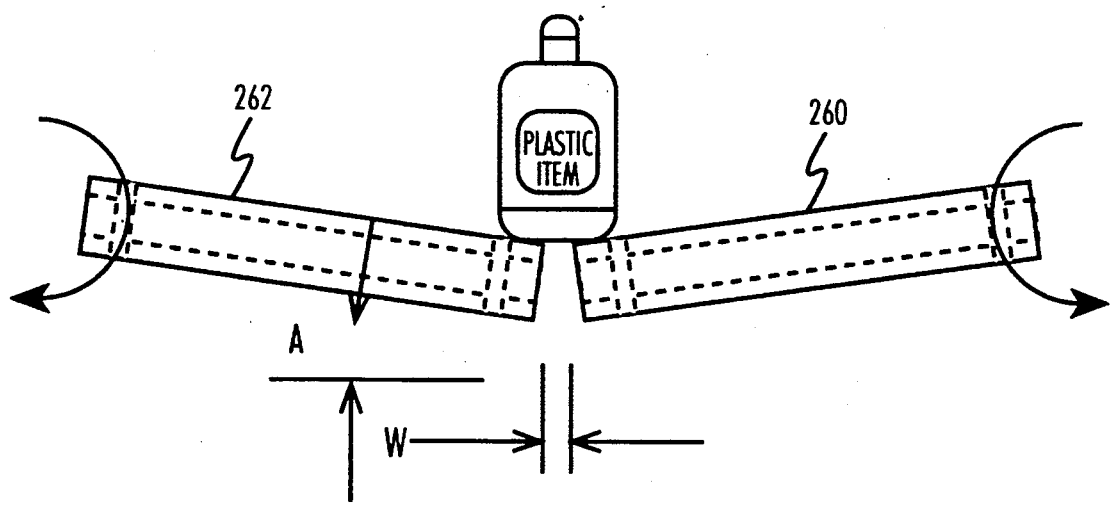

Refer next to FIGS. 2C and 2D, which show conveyor 212 in more detail. As shown, conveyor 212 comprises a first belt 260 and a second belt 262.

First belt 260 is rotatably mounted on a first roller 264 and a second roller 266. First roller 264 is driven by a conventional (for example, electric) motor 270. Rotation of roller 264 causes first belt 260 to move in the direction shown by an arrow 271.

Second belt 262 is likewise rotatably mounted on a first roller 268 and a second roller 269. First roller 268 is driven by a conventional motor 272. Rotation of roller 268 causes second belt 262 to move in a direction shown by an arrow 273.

First belt 260 and second belt 262 are inclined a specified angle "a" from the horizontal. The angle "a" may be, for example, approximately 15 degrees (a suitable range may be between 5 degrees to 25 degrees).

First belt 260 and second belt 262 are further adapted to have a spacing "w" between each other. As will be more fully described herein, the spacing "w" between the first belt 260 and the second belt 262 is provided so that the plastic items can be examined by the composition determination sub-system 122. In other words, the spacing "w" allows the plastic item to be examined from both the top and bottom of belts 260 and 262.

Further shown is a plastic item 274 (shown at position "p1") which is not in a properly oriented position (for example, lengthwise). To achieve the lengthwise orientation of the plastic item 274, the first belt 260 is moved at a slightly faster or slower rate of speed with respect to the second belt 262. The different rates of the speeds between the first belt 260 and the second belt 262, causes the plastic item 274 to become properly oriented in the spacing "d". Proper orientation of plastic item 274 is shown at position "p2".

The belts 260 and 262 have many "stipples" (not shown) formed therein. A stipple is a pointed protrusion that protrudes (rises) about $\frac{1}{8}$ inch to $\frac{3}{4}$ inch above the belt surface. First belt 260 and second belt 262 are made of a black rubber PVC based material. First belt 260 and second belt 262 are available under the tradename "Black PVC Hilltopper" from Globe Albany International, 1400 Clinton Street, Buffalo, N.Y. 14240. It has been found that the plastic items stay adequately adhered to the surface of the belts 260 and 262 even when the belts 260 and 262 are moving (traveling) at high speeds. This is necessary to provide the system 100 with high through rates.

After proper orientation has been achieved, the conveyor 212 transports the plastic items to an inspection conveyor (described below with reference to FIGS. 3 and 5), wherein inspection by the color determination sub-system 114 and composition determination sub-system 122 occurs. The plastic items are first transported to the color determination sub-system 114.

Color Determination Sub-system and Step

Figure 3:
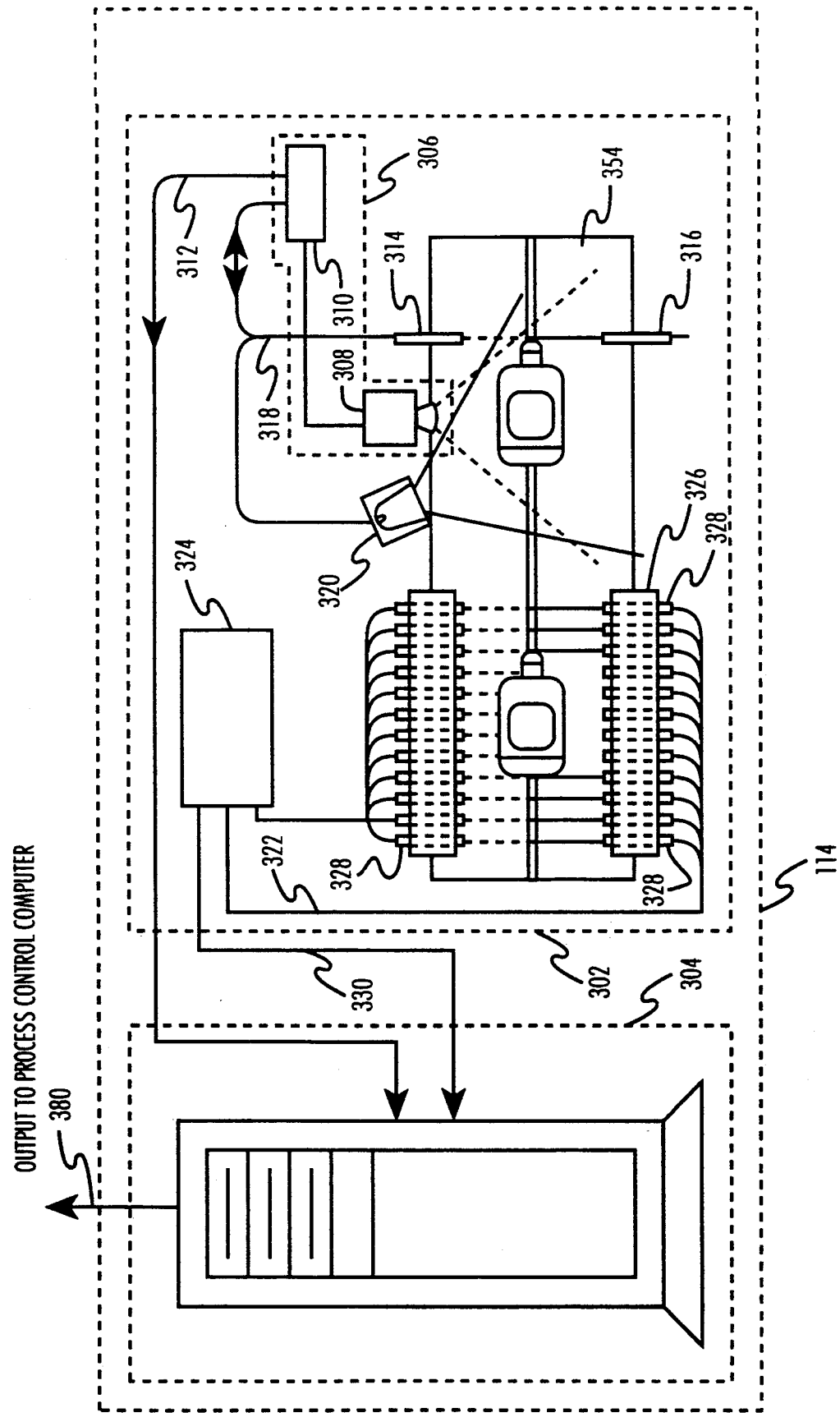
FIG. 3 is a diagram showing a more detailed view of the color determination sub-system.

Refer now to FIG. 3, where the color determination sub-system 114 is shown in more detail. The color determination sub-system 114 generally comprises a color determination device 302 and a color determination computer 304.

The color determination device 302 first comprises a color camera unit 306. Color camera unit 306 comprises a color camera 308 and a camera controller 310. The color camera 308 functions to take a video picture of the plastic item and output the same to the camera controller 310.

The camera controller 310 receives the output from the color camera 308 and generates several types of output signals which may be used for later signal processing. These outputs are as follows: (1) NTSC (composite video used to drive standard monitor), (2) Y-C (black/white image used for a variety of purposes unrelated to the present invention), and (3) RGB outputs (red, green, and blue signal data outputs). The present invention uses the RGB output format. Camera controller 310 outputs the RGB signal format over bus 312 to the color determination computer 304.

Color camera unit 306 is of conventional design. For compatibility reasons, the color camera unit 306 is typically sold as an integrated unit comprising both the color camera 308 and the camera controller 310 fully integrated. The color camera unit 306 is available from a variety of electronic manufacturers. In the preferred embodiment, the color camera unit 306 is that of a model 6800 available from Cohu Electronics, Inc., San Diego, Calif.

The color determination device 302 further comprises a camera trigger 314. Camera trigger 314 comprises a photo-eye 316 that when triggered by passage of the plastic item, outputs a "sync" signal over a bus 318 to the camera controller 310. The sync signal instructs camera controller 310 to initiate operation of the color camera 308 to thereby take a picture of the plastic item. Camera trigger 314 and photoeye 316 are of conventional design and readily available from a variety of electronic manufacturers.

The color determination device 302 further comprises a strobe light 320. Strobe light 320 is provided to fix and illuminate the moving plastic item while the color camera 308 operates to capture the video image (picture). In effect, the short duration of the light pulse freezes the moving plastic item so that the video image (picture) is not blurred. Strobe light 320 is of conventional design and can be purchased from a variety of camera and/or electronic manufacturers.

The color determination device 302 further comprises a course length array 326 and a digital input card 324. Course length array 326 and digital input card 324 generally function to provide the color determination computer 304 with data indicative of the length of the plastic item being examined. As will be more fully described herein, the color determination computer 304 uses the length information of the plastic item to determine the approximate edges of the plastic item. As will be more fully discussed herein, this feature of the present invention reduces the computation time required by the color determination computer 304 to identify the color of the plastic item.

Course length array 326 comprises a plurality of photo-eyes 328. Each photoeye 328 when actuated (caused by breaking the light path) generates a signal. This signal from each photoeye is outputted to the digital input card 324 on a bus 322. The digital input card 324 in turn outputs this length data on a bus 330 to the color determination computer 304.

The photoeyes 328 are of convention design. The photo-eyes 328 can be purchased from a variety of electronic manufacturers. The digital input card 324 is likewise of conventional design and be purchased from a variety of electronic manufacturers.

The color determination device 302 is positioned on an inspection conveyor 354. The inspection conveyor 354 is designed to allow the plastic item to be inspected therein. In this embodiment, the inspection conveyor 354 is of the same design and configuration as is the conveyor 212 of the SSO sub-system 106 (discussed in Section 4.1 and shown in FIG. 2A).

Color determination computer 304 is generally provided to perform the computational analysis necessary to identify the predominant color of the plastic item. The predominant color of the plastic item is the color of the primary plastic material. In plastic items such as soft drink bottles, the primary material is the plastic bottle as opposed to the base cap mounted on the bottom of the plastic bottle or the label positioned at the center of the plastic bottle. As such, in the case of plastic bottles, the predominant color of the plastic item would be the color of the plastic bottle as opposed to the color of the base cap or any labels that may be present therein. Color determination computer 304 is further configured to output the color data to a process control computer (to be described with reference to FIG. 7) via a line 380.

The color determination computer 304 of the preferred embodiment is a PC (personal computer) based system configured with a 80486 Intel microprocessor (Intel of Santa Clara, Calif., USA). The 80486 microprocessor based computer system is the preferred system because of its computation speed.

It should be understood, however, that the color determination computer 304 can be of any available or futurely developed computer system. Such alternative computer systems may be that, but not limited to, a super microcomputer system or the like.

Figure 4:
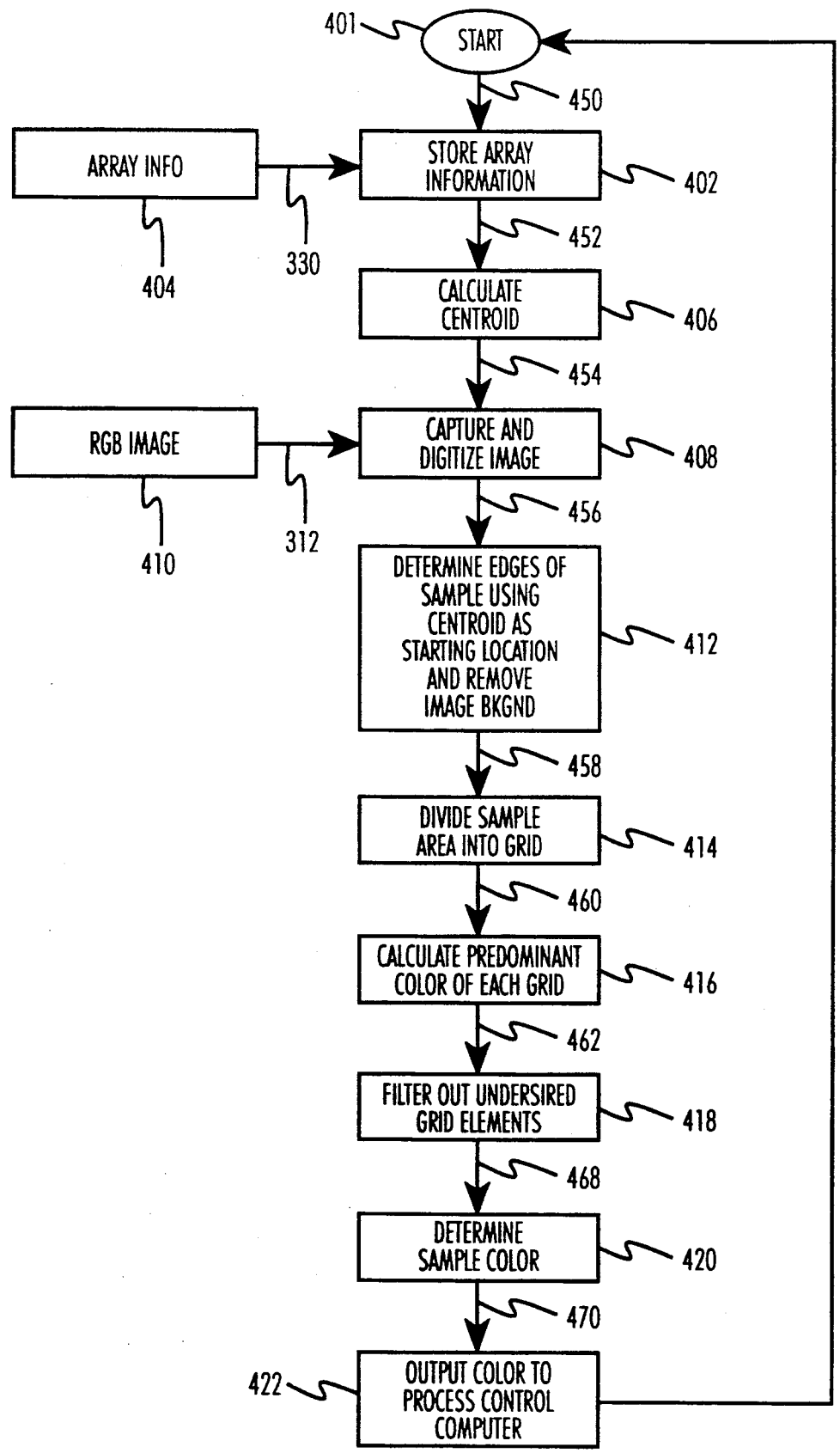
FIG. 4 is a high level flow chart showing the operation of the color determination sub-system.

As will be more fully described herein with reference to FIG. 4, the color determination computer 304 is configured with specific programming (instructions in the form of computer software) to perform the above identified tasks (features and functions).

The programming in the preferred embodiment is stored on a magnetic disk (not shown) provided within the color determination computer 304. It should be clear, however, that the programming could be stored in a variety of forms to carry out the tasks (features and functions) of color determination computer 304. By way of example only, such alternative programming form may be that of instructions stored on floppy disk, or in a Read Only Memory device.

Referring now to FIG. 4, wherein a more detailed description of the operation of the color determination computer 304 is provided. Operation is initiated by a start block 401. Control is then passed along a logic path 450 to an operation block 402.

As shown by operation block 402, the color determination computer 304 is first instructed to store the array information provided from the digital input card 324 ia line 330 (denoted by an operation block 404). Control is then passed to an operation block 406 along a logic path 452.

As shown by operation block 406, the color determination computer 304 is then instructed to determine the centroid of the particular plastic item being examined. Calculation of the centroid of the plastic item is performed using the array information stored as a result of operation block 402. Control is then passed to an operation block 408 along a logic path 454.

As denoted by operation block 408, the color determination computer 304 is then instructed to capture and digitize the RGB video image received from the color camera unit 306 via line 312 (denoted by an operation block 410). Digitization of the RGB video image is performed using conventional analog to digital conversion means. Control is then passed to an operation block 412 along a logic path 456.

As denoted by operation block 412, the color determination computer 304 is then instructed to determine the edges of the plastic item using the centroid as the starting location and remove the "background image" (to be defined below). This step is necessary to reduce unnecessary computation time of irrelevant data. The RGB data image taken by the color camera 308 must be large enough to capture the largest plastic item to be inspected. As such, when smaller plastic items are inspected, the area surrounding the plastic item (outside the plastic item's edge boundaries) will also be captured in the RGB data image. This surrounding area is defined herein to be the "background image." The area within the plastic item's edge boundaries is hereby defined to mean the "plastic item sample image." As will be described herein, the color determination computer 304 looks at the image on a pixel by pixel level. Removing pixels which are not part of the plastic item sample image significantly reduces computational time. Color determination computer 304 thus determines the edge boundaries of the plastic item and removes the background image. Although some unnecessary pixel data may still be present, a significant amount of background pixel data has been deleted. Control is then passed to an operation block 414 along a logic path 458.

As denoted by operation block 414, the color determination computer 304 is then instructed to divide up the plastic item sample image (plastic item sample image equals captured image minus background image) into a grid pattern. A grid pattern is necessary so that the color determination computer 304 can efficiently examine each pixel. Control is then passed to an operation block 416 along a logic path 460.

As denoted by operation block 416, the color determination computer 304 is then instructed to determine a RGB color value for each grid of the plastic item sample image. The color of each grid is the average RGB data value for the pixels examined in each grid. In this operation, the color determination computer 304 operates to examine each of the RGB signals for each pixel of the specified grid so as to determine an overall RGB color for each grid. Control is then passed to an operation block 418 along a logic path 462.

As denoted by operation block 418, the color determination computer 304 is then instructed to filter out non-relevant (undesired) grid elements. Non-relevant grid elements are those grid elements that represent, for example, the base cup, cap, or label components that may be present on any given plastic item. The base cup, cap or label may form part of the plastic item sample image. This is because the base cup, cap or label would be captured by the color camera unit 306, and remain even after the background image has been removed. In other words, the base cup, cap or label image remains part of the plastic item sample image because these data images are within the plastic item's edge boundaries. Removal of these non-relevant grid elements is necessary because taking into account the color of these non-relevant portions of the plastic item would otherwise contaminate identification of the predominant color of the plastic item. Control is then passed to an operation block 420 along a logic path 468.

As denoted by operation block 420, the color determination computer 304 is then instructed to determine the predominate color of the plastic item. The predominate color of the plastic item is determined by looking at each of the relevant individual grid elements and finding the most common RGB values. Control is then passed to an operation block 422 along a logic path 470.

As denoted by operation block 422, the color determination computer 304 is then instructed to output the identified color of the plastic item to the process control computer (to be described) of the sortation and discharge sub-system 118. Control is then returned along a path 424 to the start block 401, wherein the color determination computer 304 is instructed to repeat the above sequence of instructions.

Composition Determination Sub-system and Step

Figure 5:
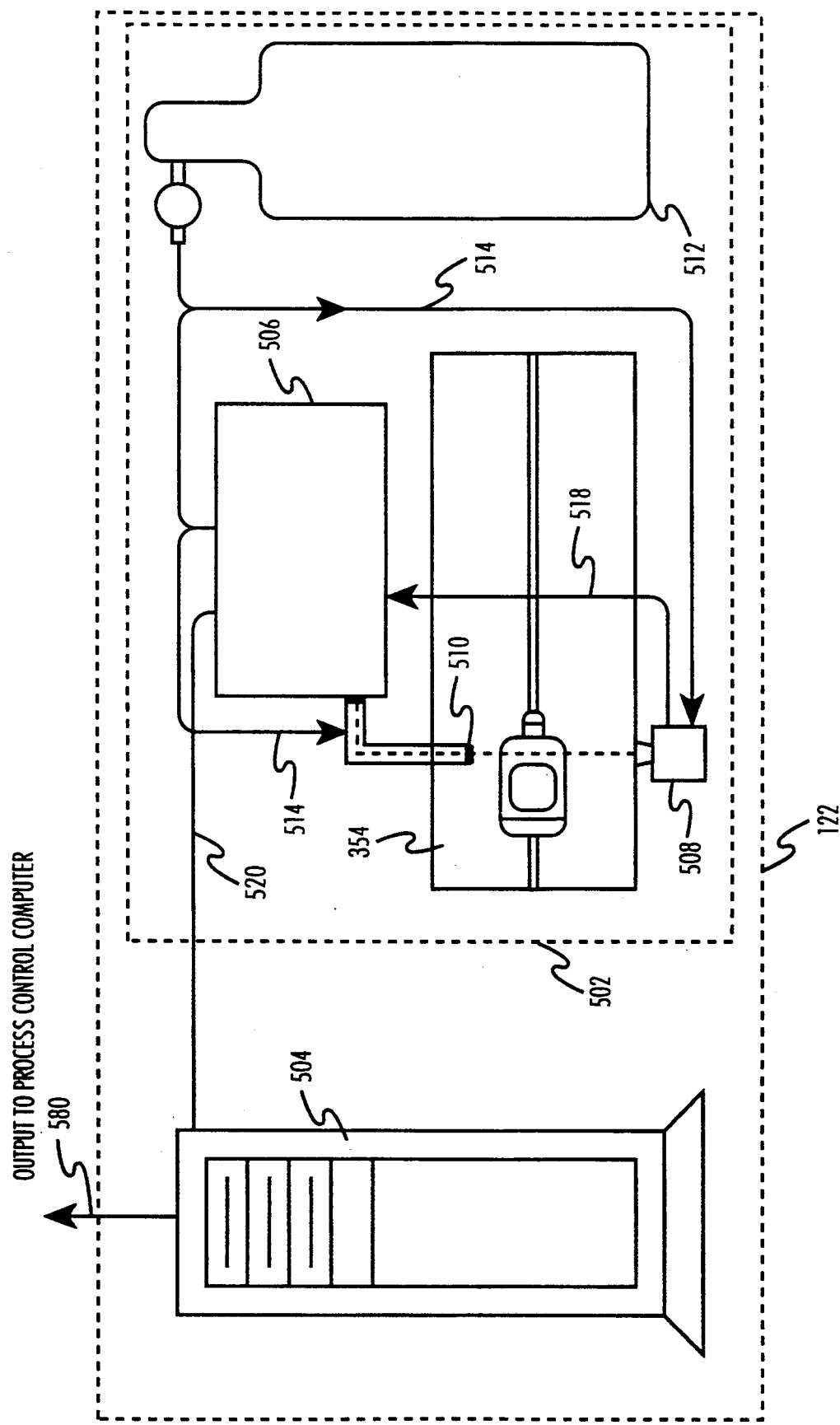
FIG. 5 is a diagram showing a more detailed view of the composition determination sub-system.

Referring now to FIG. 5, where the composition determination sub-system 122 is shown in more detail. The composition determination sub-system 122 generally comprises an infra red (IR) device 502 and a composition determination computer 504. IR device 502 and composition determination computer 504 generally function to identify the composite material of the plastic item. By way of example only, the materials to be identified may be of PET, PVC, or HDPE.

IR device 502 generally comprises an infrared photospectrometer unit 506 and a detector 508. The photospectrometer unit 506 is adapted to transmit a high intensity beam of light via a gun 510 through the plastic item. The light passed (transmitted as opposed to reflected) through the plastic item is received (sensed) by the detector 508, which sends a signal indicative of the sensed light back to the photospectrometer unit 506 on a line 518.

The photospectrometer unit 506 has internal circuitry (not shown) to generate a signal indicative of the interferogram of the plastic item (one interferogram per examination by gun 510 and detector 508). The photospectrometer unit 506 then outputs the signal to the composition determination computer 504 on a line 520, where an analysis of the data is performed to identify the plastic item's composition base. As will be more fully discussed with reference to FIG. 6, the composition determination computer 504 may use either the interferogram or a spectral analysis to identify the composite material of the plastic item.

The IR device 502 further comprises a nitrogen supply unit 512. Nitrogen supply unit 512 is provided to maintain the photospectrometer unit 506 in an oxygen free environment. This is necessary to prevent the entry of erroneous data (data indicative of air) into the generated interferogram. Nitrogen supply unit 512 is supplied to the photospectrometer unit 506 via gas lines 514.

Photospectrometer unit 506 is configured to be constantly operating. As such, depending on the speed at which the items are passed through the IR device 502 on the inspection conveyor 354, a plurality of interferograms will be generated for a particular plastic item. Alternatively, only one interferogram could be generated for a particular plastic item. However, the more interferograms that are generated, the more information that is known for all parts of the plastic item (front section, middle section, and back section).

If only one interferogram is taken, then only one set of information is known for one region of the plastic item. In this event, the single interferogram sample may have to be taken at a specific and proper location, such as to get a reading that relates to the predominate composite material of the plastic item. In other words, if a single sampling of the plastic item is taken, care must be taken to avoid sampling, for example, the cap region. Alternatively, programming must be provided to determine that a cap material overlays the plastic bottle for example.

Photospectrometer unit 506, detector 508, and nitrogen supply unit 512 of the preferred embodiment are of conventional design. Photospectrometer unit 506, detector 508 and nitrogen supply unit 512 are available as a custom designed integrated unit from Nicholet Instrument Inc., Madison, Wis. Composition determination computer 504 is provided to perform the computational analysis necessary to determine the predominant composition of the plastic item under examination. The predominant composition of the plastic item is the composition of the primary plastic material of the plastic item. In the case of soft drink containers, the predominate composition of the plastic item would be the composition of the plastic bottle as opposed to base cap or label which may overlay a given plastic bottle. Composition determination computer 504 is also provided to output the composition result to the process control computer (to be described) of the sortation and discharge sub-system 118 via a line 580. The photospectrometer unit 506 and detector 508 of the IR device 502, like the color determination device 303, are positioned on the inspection conveyor 354. Alternatively, the color determination device 302, and the photospectrometer unit 506 and detector 508 of the IR device 502, could each have their own inspection conveyors 354.

However, the inspection conveyor 354 must be especially adapted for use with the IR device 502. As discussed in connection with conveyor 212 (conveyor 354 is of the same design as is conveyor 212), the inspection conveyor 354 is designed to have a spacing (sham as "w") between moving belts. The spacing "w" is necessary so that the light beam from the photospectrometer unit 506 can pass through the plastic item and be received (sensed) by the detector 508.

Additionally, because the inspection conveyor 354 is of the same design as is conveyor 212, the plastic items remain in their proper orientation during passage through the IR device 502. This is a desirable feature because the plastic items are being transported through the IR device 502 at high through-rates.

As will be more fully described in the alternative embodiment section of this application the inspection conveyor 354 could take other configurations and still meet the requirement of the IR device 502. One such alternative embodiment would comprise air lift means. The air lift means would lift the plastic items off of the conveyor to thereby allow unobstructed examination of the plastic items. This alternative embodiment would eliminate the need for a split conveyor design (two conveyor belts). A single conveyor belt could be employed.

The composition determination computer 504 of the preferred embodiment is a PC based system configured with a 80486 Intel microprocessor. The 80486 microprocessor based computer system is the preferred system because of its computation speed.

It should be understood, however, that the composition determination computer 504 can be of any available or futurely developed computer system. Such alternative computer systems may be that, but not limited to, a super microcomputer system.

As will be more fully described herein, the color determination computer 504 is configured with specific programming (instructions) to perform the above identified tasks. The programming in the preferred embodiment is stored on a magnetic disk (not shown) provided in the color determination computer 504. It should be clear, however, that the programming could be stored in a variety of forms to include floppy disk, or firmware such a Read Only Memory device.

Figure 6:
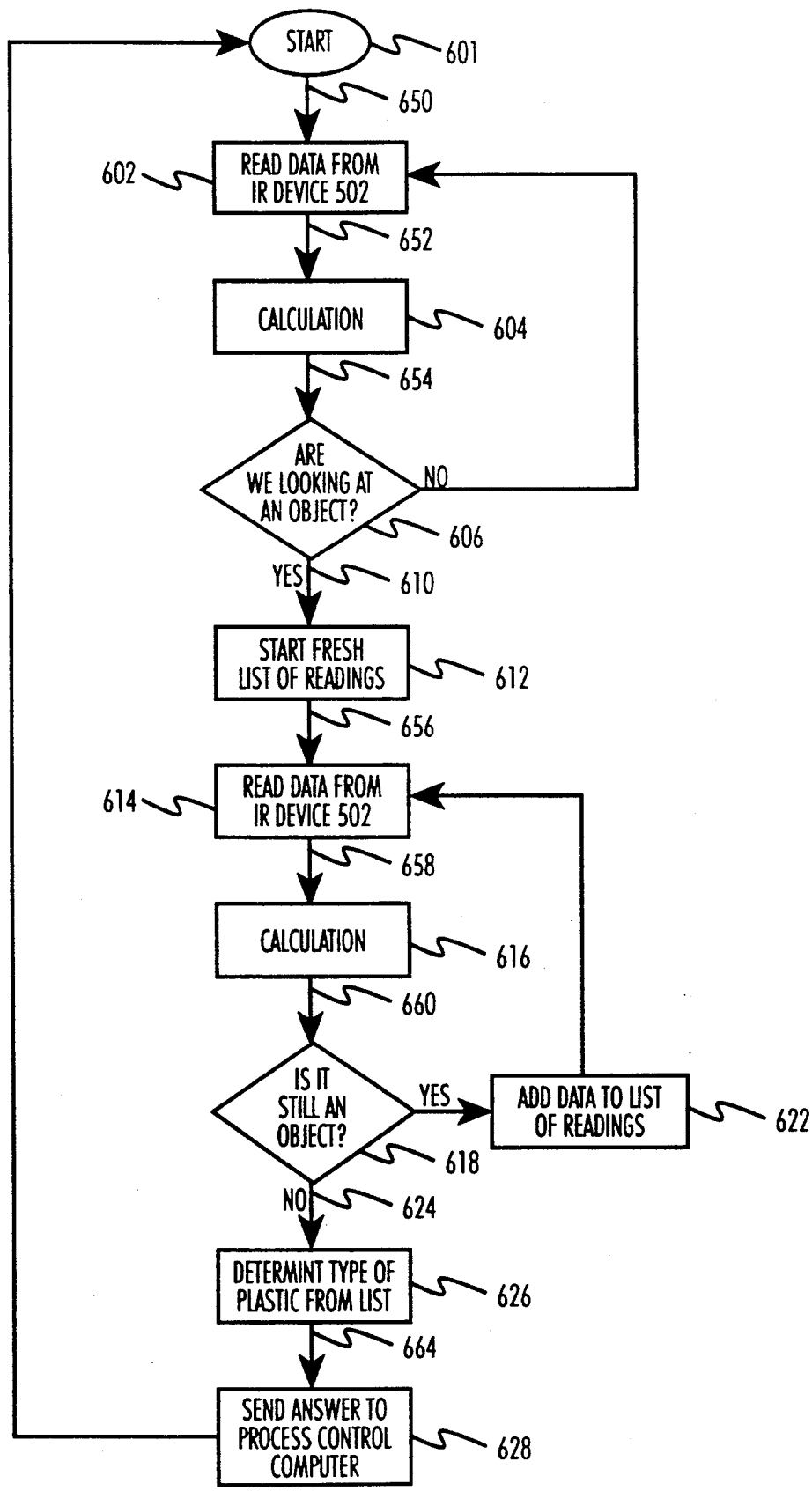
FIG. 6 is a high level flow chart showing the operation of the composition determination sub-system.

Referring now to FIG. 6, wherein a more detailed description of the operation of the composition determination computer 504 is provided. Operation begins with a start block 601. Control is then passed along a logic path 650 to an operation block 602.

As shown by operation block 602, composition determination computer 504 is first instructed to read the data from the IR device 502. This data is indicative of the interferogram of the sample reading taken. Because the IR device 502 is constantly running, the interferogram sample reading may be of a plastic item or may be that of just air. Control is then passed along a logic path 652 to an operation block 604.

As denoted by operation block 604, the composition determination computer 504 is then instructed to examine (perform calculations on data) the interferogram in order to filter out data that is not relevant to the composition of the plastic item. Such non-relevant data may be sample readings of, for example, air or paper labels instead of the plastic material of the item. The interferogram for these types of material are quite different than that of the plastic material to be identified and can thus be eliminated by this pre-filtering operation. Composition determination computer 170 then operates to convert the interferogram into a spectrogram. The spectrogram is a spectral analysis defined over a specific frequency range. The composition determination computer 504 then operates to identify the predominate composition of the plastic item based on the spectral analysis. Control is then passed along a logic path 654 to an operation block 606.

As denoted by operation block 606 if the interferogram being generated by the IR device 502 is not indicative of a plastic item, control passes along a logic path 608 to operation block 602 where a new set of data is read. If the interferogram is that of a plastic item, control is passed along a logic path 610 to an operation block 612.

As denoted by operation block 612, the composition determination computer 504 then initializes a memory to thereby store the new reading and readings (samples) to be taken of the plastic item. Control is then passed along a logic path 656, an operation block 614.

As denoted by operation block 614, the composition determination computer 504 is then instructed to read the interferograms from the IR device 501. Control is then passed along a logic path 658 to an operation block 616.

As denoted by operation block 616, the composition determination computer 504 then operates to perform the same operations as that described above for operation block 604 (identifying composition based on either interferogram or spectra analysis). Control is then passed to a decision block 618.

As denoted by decision block 618, the composition determination computer 504 if the data being read is still of a plastic item (as opposed to air, which would mean the end of the plastic item). Control is then passed via a logic path 620 to an operation block 622, wherein the data is added to that plastic item's memory list. Control is then passed back along a logic path 662 to an operation block 614 wherein a new sample of data is obtained. If, however, the data is not of an object, then the composition determination computer 504 knows that the end of the plastic item has passed through the photospectrometer unit 506 and that all the samples have been obtained. Control is then passed along a logic path 624 to an operation block 628.

As denoted by operation block 628, the composition determination computer 504 is then instructed to identify the predominate composite of the plastic item using the sample spectral data listing (one spectral analysis for each sample reading; a representative example is 5 interferograms per plastic item). Control is then passed along a logic path 664 to an operation block 628.

As denoted by operation block 628, the composition determination computer 504 is then instructed to output the composition data to the process control computer (described below) of the sortation and discharge sub-system 118. Control is returned to start block 601, wherein the composition determination computer 504 awaits data corresponding to the next plastic item.

Sortation and Discharge Sub-system and Step

Figure 7A:
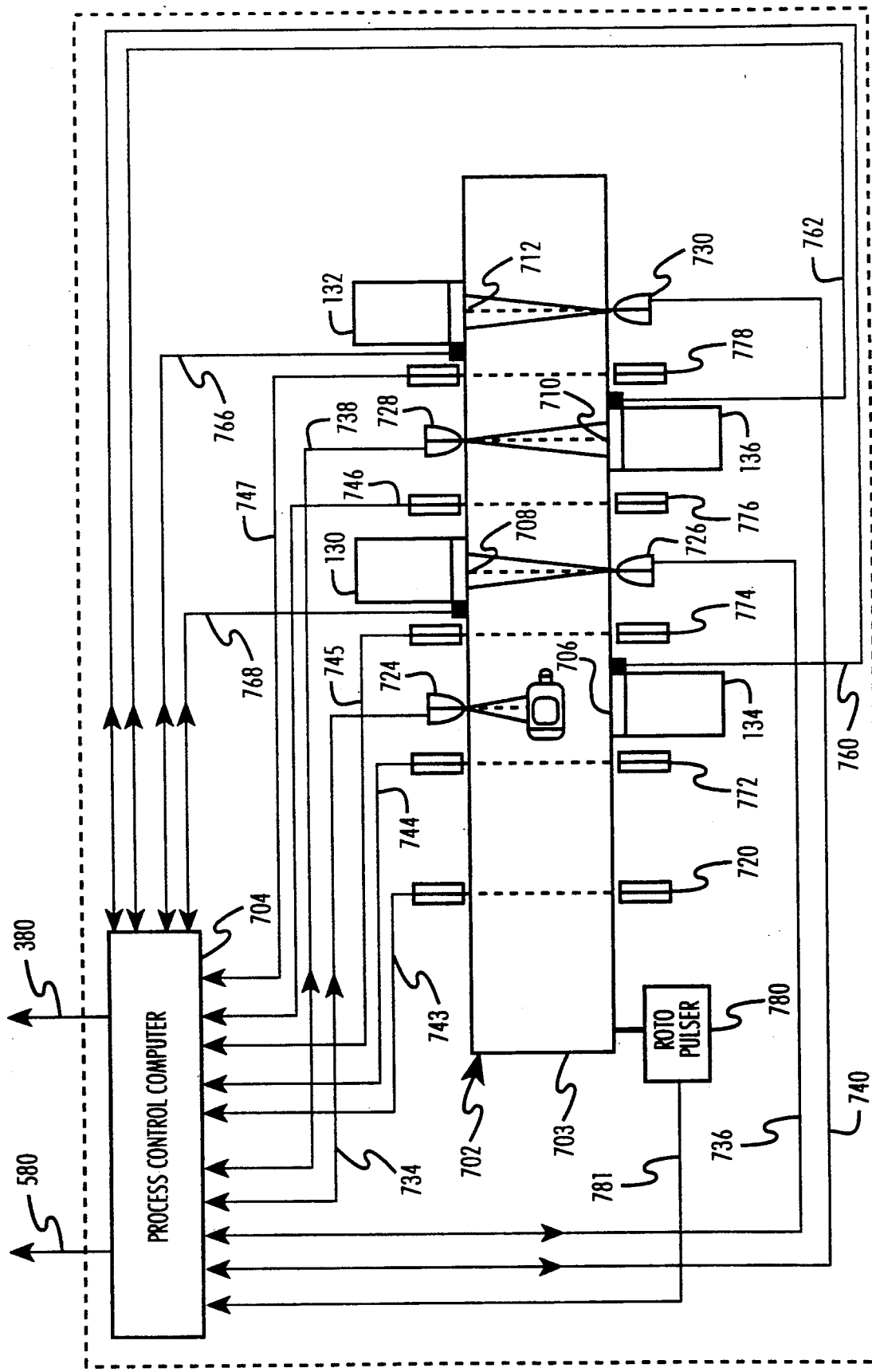
FIG. 7A is a diagram showing a more detailed view of the sortation and discharge sub-system.

Referring now to FIG. 7A, wherein the sortation and discharge sub-system 118 is shown in more detail. The sortation and discharge sub-system 118 generally comprises a discharge conveyor 702 and a process control computer 704. The discharge conveyor 702 and the process control computer 704 function to receive each plastic item as they exit the inspection conveyor 354, and depending on the plastic item's composition and color, discharge the plastic item to one of the collection vessels 130, 132, 134, or 136.

The discharge conveyor 702 comprises a conveyor 703 and a plurality of distribution gates 706, 708, 710, and 712 positioned therein. Distribution gates 706, 708, 710, and 712 are each provided with a solenoid (not shown). When activated, distribution gates 706, 708, 710, and 712 and "open." The opening of the distribution gates 706, 708, 710, and/or 712 allows a plastic item positioned adjacent to one of the distribution gates 706, 708, 710, and/or 712, respectively, to be passed to one of the collection vessels 130, 132, 134 or 136, respectively. The process control computer 704 may "open" or "close" the distribution gates 706, 708, 710, and/or 712 by outputting a signal via lines 760, 768, 762, and 766, respectively.

The discharge conveyor 702 further comprises air blast units 724, 726, 728, and 730 positioned directly across from distribution gates 706, 708, 710, and 712, respectively. Air blast units 724, 726, 728, and 730 are provided as a means for discharging the plastic items "off" the conveyor 703 and into the collection vessels 134, 130, 136 and 132, respectively. As will described below, the process control computer 704 actuates the air blast units 724, 726, 728, and/or 730, Via signal lines 734, 736, 738, and 740, respectively. As will be described below, when a plastic item 750 is positioned at its designated distribution gate, for example distribution gate 706, (designated distribution gate is the distribution gate assigned by the operator (user) to receive a specified plastic item, for example, white PVT), the process control computer 704 outputs a signal to the distribution gate 706 via line 760 causing distribution gate 706 to "open." Thereafter, the process control computer 704 outputs a signal to the air blast unit 724 via line 734. Actuation of the air blast unit 734 causes the plastic item 750 to be "blown off" (discharged off) the discharge conveyor 703 and into the collection vessel 134.

The discharge conveyor 702 further comprises a first photoeye 720. Photoeye 720 is provided to sense when a plastic item has entered the discharge conveyor 702.

The discharge conveyor 702 further comprises a rotorpulser unit 780. The rotorpulser unit 780 comprises a rotorpulse generator (not shown) connected to the drive shaft (not shown) of the conveyor 703. The rotorpulser unit 780 is provided to output pulses to the process control computer 10 via a line 781, which are proportional to the movement of the conveyor 703. In other words, the rotorpulser 780 instructs (informs) the process control computer 704 how much the discharge conveyor 703 has moved. By way of example only, the rotorpulser unit 780 may be configured such that distribution gate 706 is 1000 pulses from the photoeye 720. As will be discussed below, this information is used by the process control computer 704 to determine when a plastic item is positioned adjacent to its designated distribution gate.

The discharge conveyor 702 further comprises photoeyes 772, 774, 776, and 778 positioned just before distribution gates 706, 708, 710, and 712, respectively (for example, three pulses). Photoeyes 772, 774, 776, and 778 when activated output a signal on lines 744, 745, 746, and 747, respectively, to the process control computer 704. As will be discussed below, photoeyes 772, 774, 776 and 778 are provided as a "backup" check to ensure that a plastic item sensed by photoeye 720 is in fact approaching the designated distribution gate.

Generally, the process control computer 704 provides the necessary process control for the system 100. In this respect, the process control computer 704 provides, for example, the following functions: (1) keeps track of each plastic item in the system 100 and ensures that the plastic item's has been assigned its identified color and composition information. This is generally accomplished with the use of a "push-down shift register 782" (not shown and to be described). The second function of the process control computer 704 is to sense when a plastic item has entered the discharge conveyor 702, and output appropriate control signals so that the plastic item is discharged to its designated distribution gate based on its color and composition.

(a) Keeping track of each plastic item in the system 100 and ensuring that each plastic item has been assigned their identified color and composition information:

Referring next to FIG. 7B, wherein the "push down register" 782 of the process control computer 704 is illustrated. The push down register 782, although generally illustrated for purposes of ease of discussion, is programmed in accordance with a dedicated portion of a memory unit (not shown) of the process control computer 704.

The push down shift register 782 generally comprises an array. The array, for example, has three columns and 5000 rows (only nine rows are shown in FIG. 7B). The push down shift register 782, however, can be configured to have additional rows and/or columns so that additional plastic items and/or information can be entered and stored.

The push down shift register 782 has a first column 785. Column 785 is provided as a location to enter a plastic item as it enters the system 100.

Further shown is a column 783. Column 783 is indicative of the color of the entered plastic item as identified by the color determination sub-system 114.

Further shown is a column 784. Column 784 is indicative of the composition of the entered plastic item as identified by the composition determination sub-system 122.

The shift register 782 further comprises a plurality of rows 788–796. In operation, the first plastic item that enters the system 100, is inputted to the process control computer 704 and assigned to the first row 788, column 785. As that plastic items color and composition are identified, the respective color and composition information is entered into columns 783 and 784 of row 788, respectively.

The second plastic item that enters the system 100, is likewise assigned into row 788. Insertion of the new plastic item in row 780 causes the information in row 788 to be "pushed down" to the next row (row 789). This "push down" action occurs each time a new plastic item enters the system 100 and the process control computer 704.

The shift register 782 has shown five (5) plastic items therein (indicated as plastic items 001–005). As shown, plastic item 001 is shown positioned in row 791, plastic item 002 in row 792, plastic item 003 in row 790, plastic item 004 in row 789, and plastic item 05 in the first row 788. Further shown is color and composition information for each of plastic items 001–005, stored respectively in columns 782 and 784. In operation, many plastic items may be entered into the system 100, and thus the push down shift register 782.

When plastic item 001 was first entered in the system 100, it was positioned in the first row 788. When the plastic item 002 (second plastic item) entered the system 100, the first plastic item was "pushed down" to the second row 789. When plastic item 003 (the third plastic item) entered the system 100, all of the plastic items previously entered in the system 100, are "pushed down." In this example, the plastic item 002 was "pushed down" from row 788 row to 789, while the plastic item 002 was "pushed down" from row 789 to row 790. The above sequence of "pushing down" occurs each time a new plastic item is entered into the system 100.

The configuration shown in FIG. 7B is for five plastic items. The lowermost plastic item entry is that of plastic item 001, the first plastic item that entered the system 100. As will be described below, the lowermost entry of the push down shift register 782 will correspond to the first plastic item to enter the discharge conveyor 702 and thus the first plastic item to actuate the photoeye 720. In other words, the process control computer 704 is configured to correspond the actuation of the photoeye 720 with the lowermost entry of the push down shift register 782. The above feature allows the process control computer 704 to know what the color and composition of the plastic item that is present at the photoeye 720.

The remaining piece of information that is needed by the process control computer 704 is to know when the plastic item is positioned adjacent to its designated distribution gate. This information is provided by the rotorpulse unit 780 and photoeyes 772, 774, 776, and 778. This feature will now be described.

(b) Sensing when a plastic item has entered the discharge conveyor 702, and outputting appropriate control signals so that the plastic item is discharged to its designated distribution gate based on its color and composition:

As a plastic item passes through the photoeye 720, the process control computer 704 looks at the lowermost row of the push down shift register 782. The information contained in the lowermost row of the push down shift register 782 allows the process control computer 704 to know the plastic item's color and composition. The process control computer 704 knowing the color and composition can determine which distribution gate the plastic item should be discharged to. At that point, the process control computer 702 assigns that plastic item a "count-rate." The count rate is hereby defined to mean the number of pulses it takes (as counted by the rotorpulse unit 780) for the plastic item to reach its designated distribution gate.

By way of example, in operation, the distribution gate 706 may be specified by the operator (user) via the operator control and data acquisition sub-system 138, to collect clear PVC (the color of the plastic item is clear and the composition is PVC). Furthermore, the rotorpulser unit 780 may be configured such that it takes 1000 counts (pulses) for the conveyor 703 to travel from the photoeye 720 to the distribution gate 706. Accordingly, when a plastic item is present at the photoeye 720, and the information in the lowermost push down shift register 782 corresponds to the color "clear" and the composition "PVC", the process control computer 704 "assigns" a count-rate of 1000 counts (pulses) to the plastic item. Thereafter, the process control computer 704 begins to "count down" from 1000 counts, and at count 0, knows to "open" the distribution gate 706 and to then actuate the air blast unit 724, thus discharging the plastic item to the collection vessel 134.

The photoeyes 772, 774, 776, and 778 are positioned about three counts (pulses) prior to the distribution gates 706, 708, 710, and 712, respectively. In operation, the photoeyes 743, 744, 745, and 746 are provided to ensure that the plastic item is present at the corresponding distribution gate when the process control computer 704 completes a count for a particular plastic item. With respect to the example discussed above, the process control computer 704 would look to see if the photoeye 722 was activated at the count of three.

Use of the rotorpulser unit 280 allows the process control computer 704 to know when each of the plastic items is positioned at its designated distribution gate. Alternatively, "time information" could be used by the process control computer 704 to know when a plastic item has reached its designated distribution gate. In other words, the process control computer 704 could be configured to count time instead of counting pulses read from the rotorpulser unit 780. However, counting by time may cause problems if the speed of the discharge conveyor 702 changes. The discharge conveyor 702 speed may change, for example, by a surcharge of energy. With the use of the rotorpulser unit 780, however, changes in speed of the discharge conveyor 702 do not effect the position of the plastic item relative to its designated distribution gate. This is because the rotorpulser unit 780 count-rate is proportional to the speed of the discharge conveyor 720.

For proper orientation, it is desirable to have the air from the air blast units come in contact with the center of the plastic item. This ensures speed and accuracy.

As will be more fully described herein, the process control computer 704 is configured with specific programming (instructions) to perform the above identified tasks (features and functions). The process control computer 704 is a programmable logic controller (PLC), which is well known in the art. A typical PLC can be purchased from Reliance Electric Inc., Cleveland, Ohio. A PLC is the preferred configuration of the process control computer 704 because the PLC is especially designed for control type tasks and high speed counting from the rotorpulser.

It should be understood, however, that the process control computer 704 can be of any available or futurely developed computer system. Such alternative computer systems, for example may be that of a PC based system.

Figure 8:
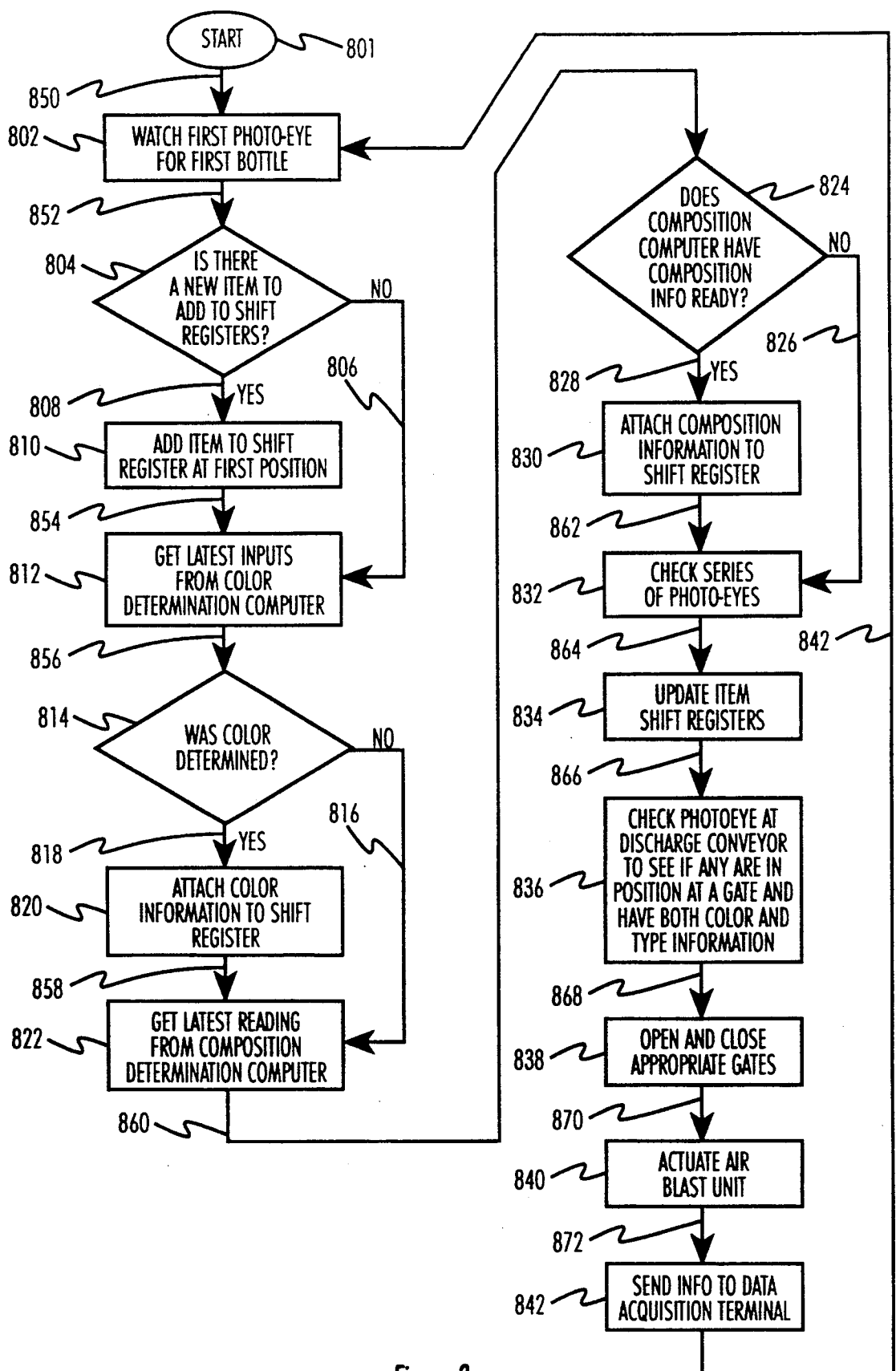
FIG. 8 is a high level flow chart showing the operation of the sortation and discharge sub-system.

Refer now to FIG. 8, wherein a more detailed description of the operation of the process control computer 704 is provided. Operation begins with a start block 801. Control is then passed along a logic path 850 to an operation block 802.

As shown by operation block 802, the process control computer 704 is instructed to monitor a color determination device photoeye (not shown) positioned just before the color determination sub-system 114 to sense the entry of a plastic item. Control is then passed along a logic path 852 to a decisional block 804.

As denoted by operation block 804, process control computer 704 is then instructed to determine whether there is a new bottle present at the color determination device photoeye. If the same plastic item (which may be present by a photoeye reading through the "open spaced handle" of a milk container for example) or no plastic item is present at the photoeye, then control passes along a logic path 806 to an operation block 812. If, however, a new plastic item is present, then control is passed via a logic path 808 to an operation block 810.

As denoted by operation block 810, the process control computer 704 is then instructed to add the new plastic item to the push down shift register 782. Control is then passed along a logic path 854 to the decision block 812.

As denoted by operation block 812, the process control computer 704 then operates to retrieve the latest data from the color determination computer 304. Control passes along a logic path 856 to an operation block 814.

As denoted by operation block 814, the process control computer 704 is then instructed to determine if the data from the color determination computer 304 is the color of the plastic item just examined. If no new color data has been generated, control passes along a logic path 816 to an operational block 822. If color data is available, then control is passed along a logic path 818 to an operation block 820.

As denoted by operation block 820, the process control computer 704 then operates to take the color data from the color determination computer 304 and enter it in column 783 of the first row of the push down shift register 782. In other words, the process control computer 704 ensures that the color data retrieved is attached to the plastic item that was examined by the color determination device 302. Control is then passed along a logic path 858 to an operation block 822.

As denoted by operation block 822, the process control computer 704 then operates to retrieve the latest composition data from the composition determination computer 504. Control then passes along a logic path 860 to an operation block 824.

As denoted by operation block 824, the process control computer 704 then operates to determine if the latest information is that of the composition of a plastic item. If the information is that of the composition of a plastic item, then control passes along a logic path 828 to an operation block 830. If, however, the information is not the composition of the plastic item (for example, an air reading), then control is passed along a logic path 826 to an operation block 832.

As denoted by operation block 830, the process control computer 704 adds the composition information to the push down shift register 782. Control is then passed along a logic path 862 to operation block 832.

As denoted by operation blocks 832 and 834, the process control computer 704 is then instructed to check the photoeyes positioned at the color determination sub-system 114, and if a new plastic item is present, update positional information in the push down shift register. Control is then passed along a logic path 866 to an operation block 836.

As denoted by operation block 836, the process control computer 704 then operates to check whether the photoeye 720 positioned at the discharge conveyor 702 has sensed a plastic item positioned therein. The process control computer 704 can sense via photoeye 720 when a plastic item has entered the discharge conveyor 702. Upon entry, and depending upon the corresponding color and composition entries in the shift register, the process control computer assigns a predetermined pulse count to that plastic item. For example, the process control computer 704 may be designated for 100 pulse from the photoeye 702 to the distribution gate 706. Movement of the discharge conveyor 702 causes the rotorpulser 780 to output pulses to the process control computer 704. Accordingly, the output from the rotorpulser 280 lets the process control computer 704 know how far the plastic item has moved from the photoeye. In the above example, when the computer senses that 1000 pulses have occurred, it now known that the plastic items is at the proper distribution gate (in this example 706). If no plastic items are positioned at the photoeye 720, then control is returned to start block 801 wherein the above operational sequence is repeated. If, however, a plastic item is at the photoeye 720, then control is passed along a logic path 868 to an operation block 838.

As denoted by operation block 838, the process control computer 704 is then instructed to open the appropriate distribution gate upon completion of the count rate. To open the given distribution gate, the process control computer is instructed to output a signal to the distribution gate's solonid. Activation of the distribution gate solonid causes the distribution gate to open. Control is then passed along a logic path 870 to an operation block 840.

As denoted by operation block 840, the process control computer 704 is instructed to output a signal to the air blast unit that corresponds to the opened distribution gate. Activation of the air blast unit causes the plastic item to be "blown-off" (pushed off) the conveyor 703. Control is then passed along a logic path 872 to an operation block 842.

As denoted by operation block 842 process control computer 704 then operates to output any of a variety of information data about the discharged plastic item to the operator interface and data acquisition sub-system 130. Control is then returned via a path B42 to the start block 801 wherein the above operation sequence is repeated.

Operator Interface Sub-system and Step

The operator interface and data acquisition sub-system 138 (discussed prior with reference to FIG. 1) is configured to provide an operator (user) with control and/or data acquisition capabilities.

By way of example only, the operator interface and data acquisition sub-system 138 allows the operator to change the discharge gate location of a particular type of plastic item. Operator interface and data acquisition sub-system 138 may also allow the operator to turn the system on and off, as well as control the speed that the plastic items are moved through the system 100.

The operator interface and data acquisition sub-system 130 is further configured to receive data from the process control computer 704. This data may form a data base which can be used to determine, for example, inventory data, customer use and quantity, and many other types of information useful in the recycling of plastic and other items.

Other Alternative Embodiments

Figure 12:
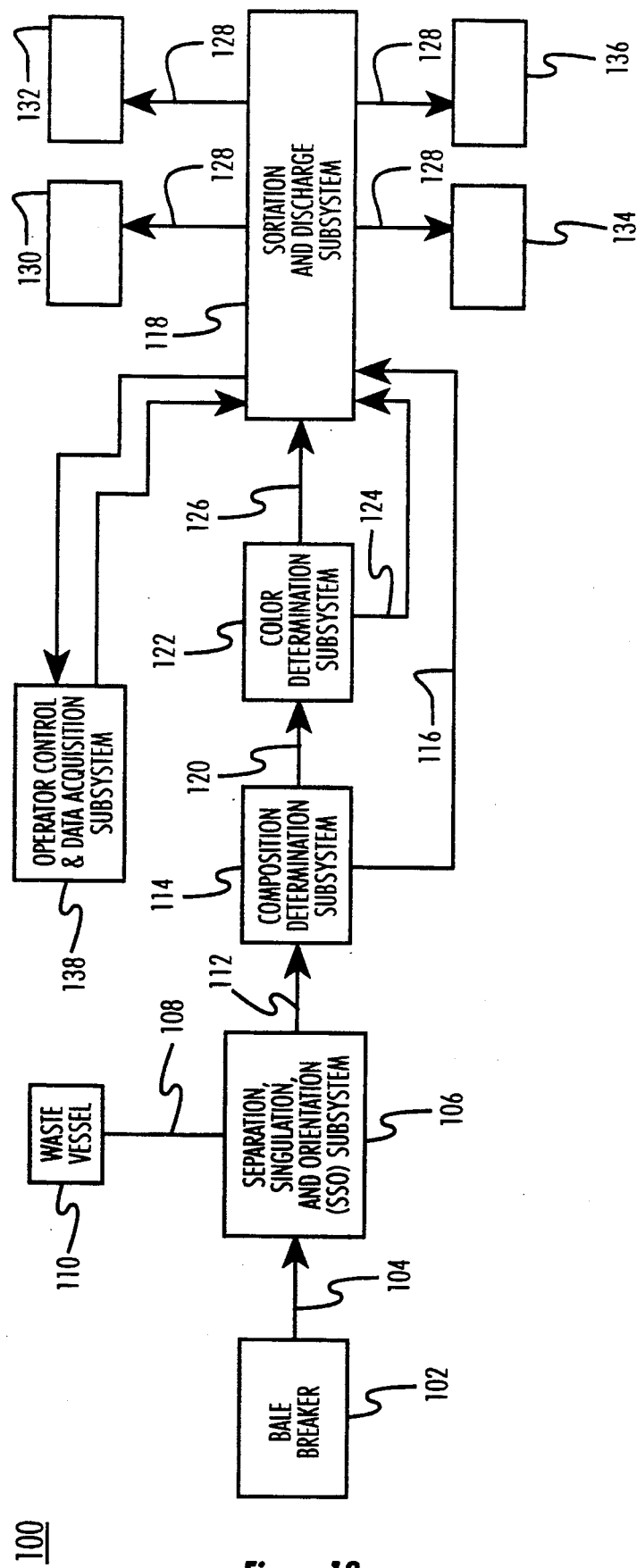
FIG. 12 is a diagram showing an alternative embodiment of the present invention.

Although the present invention has been described by means of a specific embodiment, it should be readily apparent to those of ordinary skill in the art that numerous changes and modifications can be made therein without departing from the spirit and scope of the invention as defined in the claims. By way of example only, such alternative embodiments of the system 100 and method of the present invention may be as follows:

(1) As described in the context of FIG. 1, the plastic items, after leaving the separating, singulating, and orientating sub-system 106, enter the color determination sub-system 114 and then the composition determination sub-system 122, and finally the sortation and discharge sub-system 118. One alternative embodiment (shown in FIG. 12), would have the composition determination sub-system 122 positioned before the color determination sub-system 114. In other words, the plastic items after leaving the separating, singulating, and orientating sub-system 106 would next enter the composition determination sub-system 122 and then the color determination sub-system 114.

(2) As described heretofore, the color determination sub-system 114 and the composition determination sub-system 122 are integrated as one examination unit and are mounted on the one inspection conveyor 354. One alternative embodiment, is to have the color determination sub-system 114 and the composition determination sub-system 122 designed as separate examination units, so that each has its own inspection conveyor.

(3) As described heretofore, the inspection conveyor 354 is of a two piece split design. As discussed, the two piece design was provided so that the light beam from the IR photospectrometer 506 can pass through the plastic items and into detector 508. Alternatively, the inspection conveyor 354 could be configured with air lift means. The air lift means would serve the function of raising the plastic items off of the inspection conveyor 354 so that the plastic items could be inspected (the light beam could be passed in a horizontal direction as opposed to a vertical direction).

Figure 9:
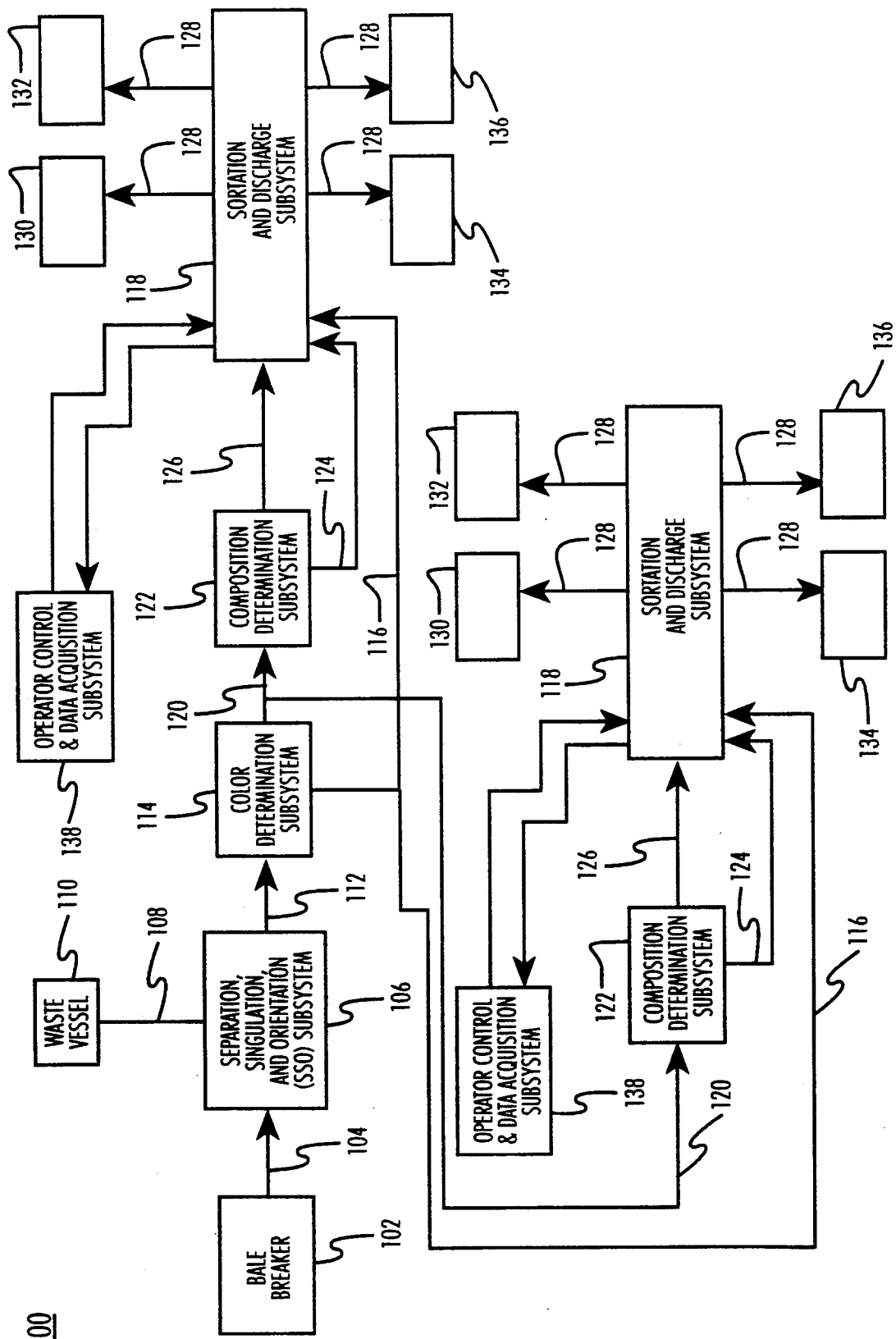
FIG. 9 is a diagram showing an alternative embodiment of the present invention.

(4) As described heretofore, the plastic items are first passed through the color determination sub-system 114 and then passed through the composition determination sub-system 122. Such a system configuration may in some circumstances have a slow "through-rate". In other words, it may take more time to sort the plastic items. Too increase the "through-rate" the system 100 could be alternatively designed such that the plastic items after leaving the color determination sub-system 114 are distributed on two or more (multiple) lines, each line having an associated composition determination sub-systems 122. This configuration is shown in block diagram form in FIG. 9. This system configuration may be preferred when the color determination sub-system 114 is faster than the composition determination sub-system 122.

Figure 10:
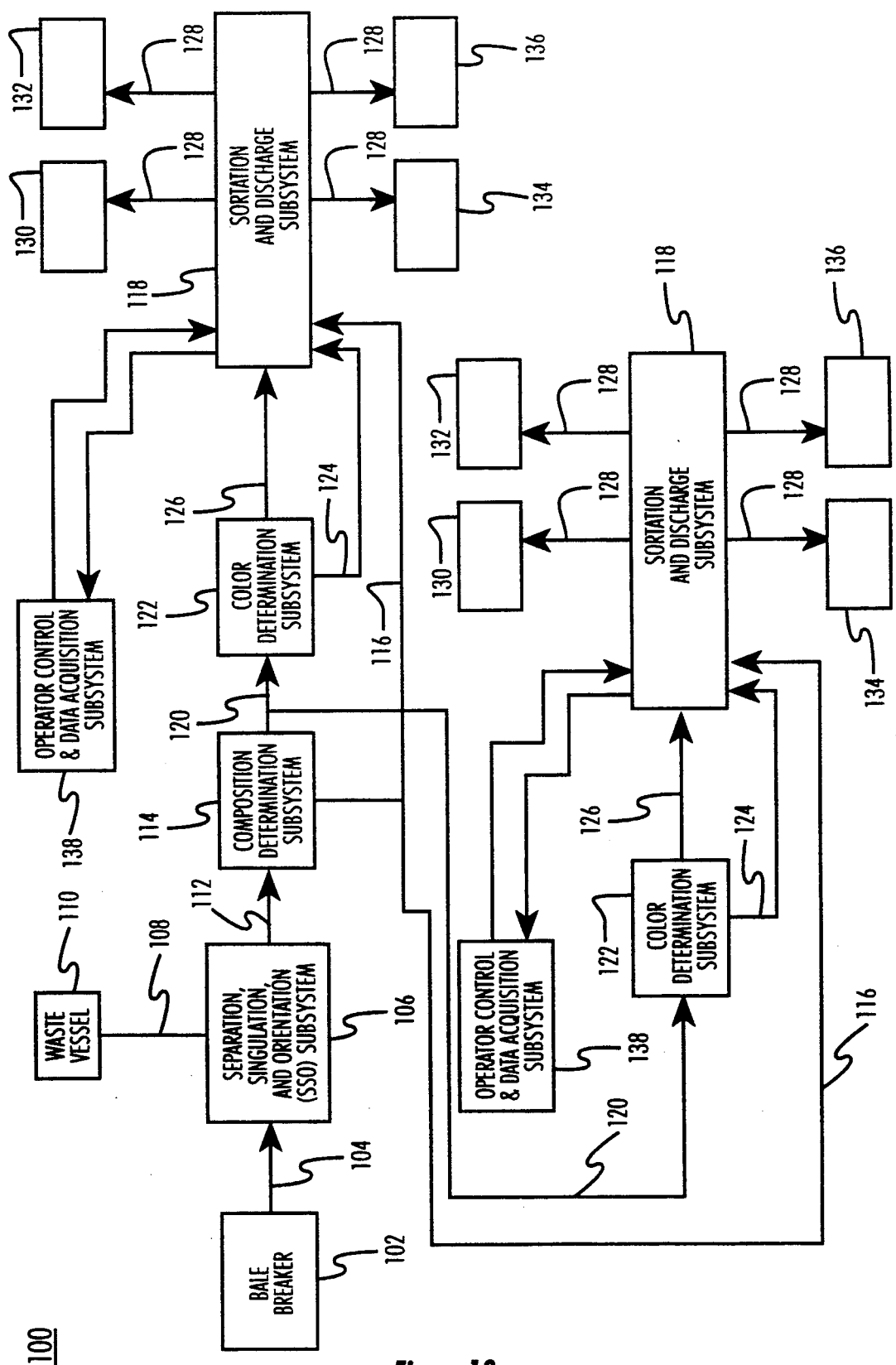
FIG. 10 is a diagram showing an alternative embodiment of the present invention.

If, however, the composition determination sub-system 122 is faster than the color determination sub-system 114, the system and method could alternatively be configured as shown in FIG. 10. In this alternate embodiment, the system and method are configured such that the plastic items are first inspected by the composition determination sub-system 122 and then distributed on multiple lines, each having a color determination sub-system 114.

Figure 11:
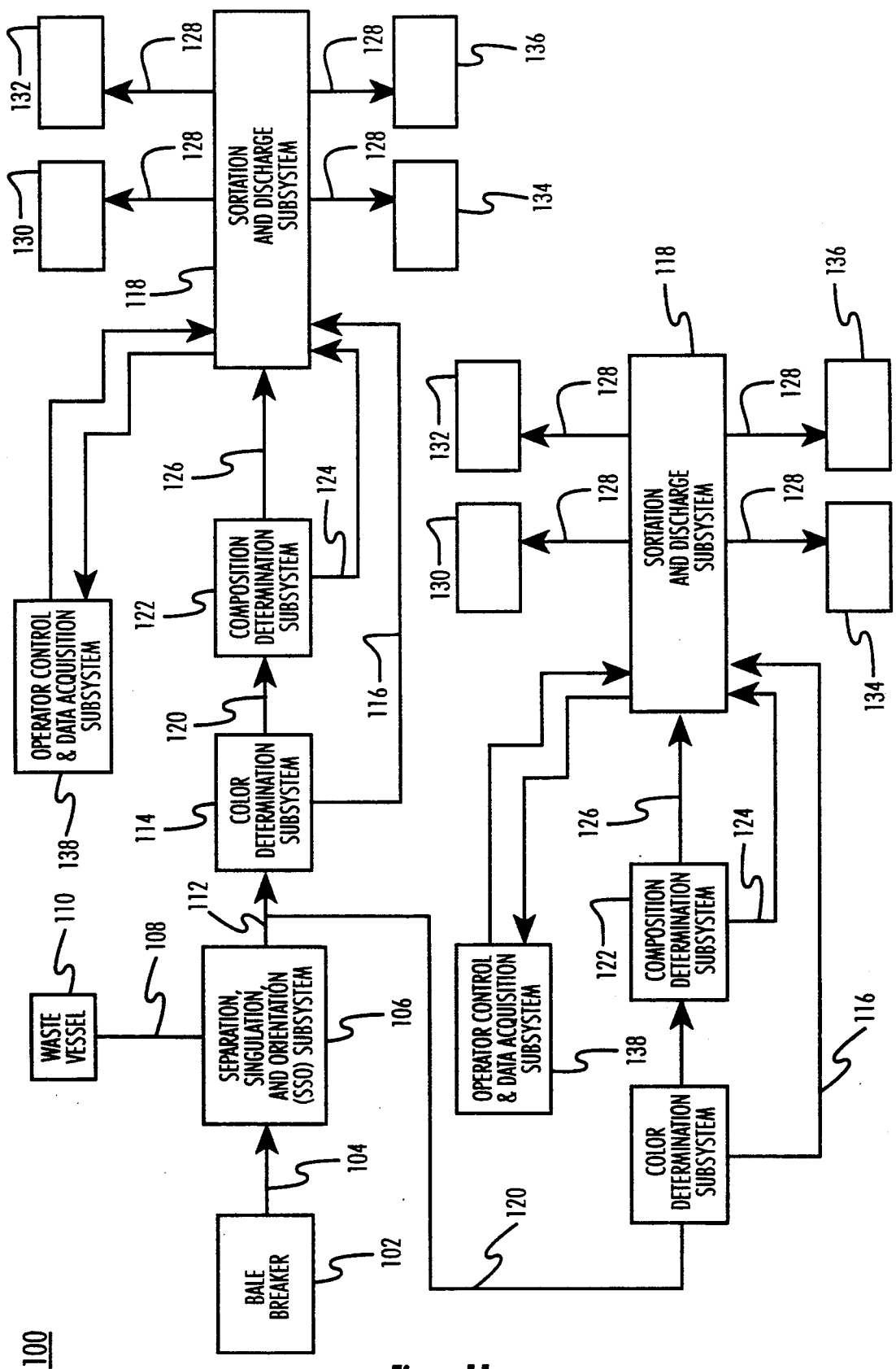
FIG. 11 is a diagram showing an alternative embodiment of the present invention.

(5) FIG. 11 shows in block diagram form another alternate embodiment for the system and method of the present invention. In this alternate embodiment, the system and method are configured with separate examination lines (each examination line would have a color determination sub-system 114, a composition determination sub-system 122 and a sorting and discharge sub-system 118) leading from a single separating, singulation, and orientation sub-system 106.

(6) As described heretofore, the color determination sub-system 114 uses a strobe light 320 and a color camera device 308. In this embodiment the color camera device 308 is designed such it needs the strobe light 320 in order to "freeze" the moving plastic item so that a clear image (picture) can be taken. Alternatively, however, the color determination sub-system 114 could be configured with an advanced technology color camera that can use ordinary light without the need for strobe light 320. Such a color camera may have to be designed to account for the motion of the plastic item. Alternatively, the inspection conveyor 354 could be designed to stop while the photo image is being captured by the color camera device 308. Such a configuration, however, may reduce the overall "through-rate" of the plastic items.

(7) As described heretofore, the system and method of the present invention uses one color determination computer 304 for the color determination sub-system 114, one composition determination computer 504 for the composition determination sub-system 122, and one process control computer 704 for the sorting and discharge sub-system 118. Alternatively, a single computer (computer platform) could be employed operating in a time sharing and/or parallel processing mode for the color, composition, and shorting/discharge computations.

(8) The system and method of the present invention could be integrated with an automated dispensing and customer ID and billing system (now shown). Such a system and method could be configured using key cards (similar to the ID sequencing associated with automated teller machines) so that customers (users) walk up to obtain the plastic they want to buy. This may reduce recycling costs.

(9) As described heretofore, the separating, singulating and orientation sub-system 106 is one integrated unit. Alternatively, the separating, singulating and orientation sub-system 106 could be configured as separate independent units and steps. Moreover, system and method may use only one of the separating, singulating, and/or orienting feature sub-systems and steps, or any combination of the same. Independent separating, singulating and orientating units would add flexibility to the operation and application of the present invention.

(12) As heretofore described, the system and method of the present invention uses an automated separating, singulating and orientation sub-system 106. Alternatively, a manual separating, singulating and/or orientating operation could be used.

(13) As heretofore described, the system and method of the present invention employs the color determination sub-system 114 and the composition determination sub-system 122. Alternatively, the system and method of the present invention could use only a color determination sub-system 114 or a composition determination sub-system 122. Such a configuration would be desirable if the bales of plastic items were, for example, all HDPE, which would require only the shorting of the individual colors of HDPE from each other.

(14) As discussed heretofore, the system and method of the present invention uses air blast units 724, 726, 728, 730, and 732 to discharge the plastic items "off" the discharge conveyor 702. Alternatively, a moving arm or a rotating belt flap overhead could be used such as to push the plastic items "off" and discharge conveyor 702.

The above discussed alternative embodiments are by way of example only. It should be readily apparent to those of ordinary skill in the art that numerous changes and modifications can be made with reference to the specific embodiment and alternative embodiments without departing from the spirit and scope of the invention as defined in the claims.

What is claimed is:

1. A computer-controlled system for sorting a plurality of plastic items, comprising;
   (a) first means for identifying the predominant color of each of the plastic items, including
      (1) a color camera device configured to output a signal in a red, green, blue (RGB) format,
      (2) a course length array unit configured to output a signal, and
      (3) a color determination computer coupled to said color camera device and to said course length array unit, said color determination computer being configured to identify the color of the plastic item based on said color camera output signal and said length array unit output signal, said color determination unit being further configured to determine the centroid of each of the plastic items using said length array unit output signal;
   (b) second means for identifying the predominant composition of each of the plastic items; and
   (c) third means for discharging each of the plastic items to one of a plurality of collection vessels based on the predominant color of the plastic item as identified by said first means and the predominant composition of the plastic item as identified by said second means.

2. The computer-controlled system of claim 1, further comprising means for separating, singulating and orientating the plastic items.

3. The computer-controlled system of claim 1, further comprising means for collecting data about the plastic items that have been discharged.

4. The computer-controlled system of claim 1, wherein said second means comprises an infra infra-red (IR) device and a composition determination computer, said IR device being adapted to scan each of the plastic items at least one time to produce an interferogram of the plastic item, said IR device being further configured to output a signal indicative of said interferogram of the plastic item to said composition determination computer, said composition determination computer being configured to identify the composition of the plastic item based upon said signal.

5. The computer-controlled system of claims 4, wherein said composition determination computer determines if any of said interferograms are irrelevant to the identification of the predominant composition of the plastic item.

6. The computer-controlled system of claim 5, wherein said composition determination computer converts said interferograms into a spectral analysis.

7. A computer-controlled system for sorting a plurality of plastic items, comprising:
   (a) first means for identifying the predominant color of each of the plastic items;
   (b) second means for identifying the predominant composition of each of the plastic items; and
   (c) third means for discharging each of the plastic items to one of a plurality of collection vessels based on the predominant color of the plastic item as identified by said first means and the predominant composition of the plastic item as identified by said second means, wherein said third means comprises:
      (1) a discharge conveyor
      (2) a process control computer,
      (3) a plurality of distribution gates, each of said plurality of distribution gates leading to one of said plurality of collection vessels,
      (4) means, including a solenoid positioned at each of said plurality of distribution gates and coupled to and actuated by said process control computer, for opening and closing each of said plurality of distribution gates,
      (5) an air blast unit positioned substantially across from each of said distribution gates and coupled to and actuated by said process control computer to thereby "blow off" a plastic item that is positioned adjacent to one of said distribution gates, and
      (6) a photoeye, positioned at the entrance of said discharge conveyer, and coupled to said process control computer to output a signal to said process control computer, to inform said process control computer that one of the plastic items has entered the discharge conveyor.

8. The computer-controlled system of claim 7, wherein said discharge conveyor further comprises a rotorpulser unit, said rotorpulser unit being configured to output a signal to said process control computer, said signal being indicative of how much said conveyor of said discharge conveyor has moved.

9. The computer-controlled system of claim 8, wherein said process control computer is configured with a register, said register being configured to store each of the plastic items in the system and their color as identified by said first means and their composition as identified by said second means.

10. The computer-controlled system of claim 9, wherein said process control computer is configured to access a plastic item's color and composition information stored in said register when said plastic item is sensed by said first photoeye.

11. The computer-controlled system of claim 10, wherein said process control computer is further configured to assign a count to the plastic item sensed by said first photoeye based upon said color and said composition information and to begin counting down using said signal from said rotorpulser unit, said assigned count being indicative of how much the conveyor has to move before the plastic item is adjacent to its designated distribution gate.

12. The computer-controlled system of claim 11, wherein said process control computer is further configured to open one of said distribution gate and actuate said air blast unit when count has been counted down.

13. A computer-controlled system for sorting a plurality of plastic items, comprising:
 (a) first means for identifying the predominant color of each of the plastic items;
 (b) second means for identifying the predominant composition of each of the plastic items, wherein said second means comprises an inspection conveyor having a first belt and a second belt spaced from said first belt; and
 (c) third means for discharging each of the plastic items to one of a plurality of collection vessels based on the predominant color of the plastic item as identified by said first means and the predominant composition of the plastic item as identified by said second means.

14. The computer-controlled system of claim 13, wherein said first belt and said second belts are inclined an angle from said horizontal.

15. The computer-controlled system of claim 14, wherein said first belt is moving slightly faster than said second belt to thereby provide proper orientation of each of the plastic items.

16. The computer-controlled system of claim 13, wherein said inspection conveyor further comprises means for lifting each of the plastic items off of said inspection conveyor to thereby allow examination of the plastic items.

17. A computer-controlled system for sorting a plurality of plastic items, comprising:
 (a) first means for identifying the predominant color of each of the plastic items;
 (b) second means for identifying the predominant composition of each of the plastic items;
 (c) third means for discharging each of the plastic items to one of a plurality of collection vessels based on the predominant color of the plastic item as identified by said first means and the predominant composition of the plastic item as identified by said second means; and
 (d) a separation, singulation, and orientation (SSO) sub-system for separating, singulating and orientating the plastic items, said SSO sub-system comprising at least one vibrator bed having a fin, a first conveyor and a second conveyor, said fin being adapted such that acceptable plastic items are passed onto said first conveyor and the unacceptable plastic items are passed onto said second conveyor.

18. The computer-controlled system of claim 17, wherein said SSO sub-system further comprises a third conveyor, said third conveyor being provided to receive the plastic items from said first conveyor and to transport the plastic items to said first means.

19. The computer-controlled system of claim 18, wherein said SSO sub-system further comprises means for providing a spacing between said plastic items positioned on said conveyor.

20. A computer-controlled method for sorting plastic items, comprising the steps of:
 (a) identifying the color of the plastic items by
  (1) taking a video picture of the plastic item,
  (2) identifying the color of the plastic item based on the video picture;
  (3) determining the edges of the plastic item,
  (4) dividing plastic item image into grid elements,
  (5) identifying the predominant color of each grid,
  (6) filtering out undesired grid elements, and
  (7) identifying the predominant color of plastic item based on the unfiltered grid elements;
 (b) identifying the composition of the plastic items; and
 (c) discharging the plastic items to one of a plurality of collection vessels based on the plastic item's color as identified by said identifying step and composition as identified by said composition identifying step.

21. The method of claim 20, further comprising the step of separating the plastic items which are too small to be examined by said color identifying step and said composition identifying step.

22. The method of claim 21, further comprising the step of orientating each of the plastic items in a specified direction.

23. The method of claim 22, wherein said direction is lengthwise.

24. The method of claim 20, wherein said composition identifying step comprises the steps of:
 (a) scanning each of the plastic item at least one time to generate an interferogram of the plastic item; and
 (b) identifying the composition of the plastic item based on the interferogram.

25. The method of claim 24, wherein said composition identifying step may further comprise the steps of converting said interferogram into a spectral analysis and identifying the composition based upon the spectral analysis.

26. A computer-controlled method for sorting plastic items, which method comprises the steps of:
 (a) identifying the color of the plastic items;
 (b) identifying the composition of the plastic items; and
 (c) discharging the plastic items to one of a plurality of collection vessels based on the plastic item's color as identified by the said identifying step and composition as identified by said composition identifying step, said discharging step comprising the further steps of
  (1) storing the plastic item's color and composition as identified by said color identifying step and said composition identifying step,
  (2) sensing when a plastic item has entered the discharge conveyor,
  (3) retrieving the stored color and composition information of the sensed plastic item, and
  (4) assigning a count rate to said sensed plastic item based on the stored color and composition information.

27. The method of claim 26, wherein said discharging step further comprises the steps of:
 (a) counting down the count assigned to the plastic item;
 (b) opening a distribution gate; and
 (c) actuating an air blast unit when the count reaches zero.

28. A computer-controlled system for sorting a plurality of plastic items, which system comprises:
 (a) first means for identifying the predominant color of each of the plastic items;
 (b) second means for identifying the predominant composition of each of the plastic items, said second means including an infra-red (IR) device and a composition determination computer, said IR device being adapted to scan each of the plastic items at least one time to produce an interferogram of the plastic item, said IR device being further configured to output a signal indicative of said interferogram of the plastic item to said composition determination computer, said composition determination computer being configured to identify the composition of the plastic item based upon said signal and to determine if any of said interferograms are irrelevant to the identification of the predominant composition of the plastic item; and (c) third means for discharging each of the plastic items to one of a plurality of collection vessels based on the predominant color of the plastic item as identified by said first means and the predominant composition of the plastic item as identified by said second means.

29. The computer-controlled system of claim 28, wherein said composition determination computer converts said interferograms into a spectral analysis.

* * * * *